(12) United States Patent
Steinmetz et al.

(10) Patent No.: US 7,320,084 B2
(45) Date of Patent: Jan. 15, 2008

(54) MANAGEMENT OF ERROR CONDITIONS IN HIGH-AVAILABILITY MASS-STORAGE-DEVICE SHELVES BY STORAGE-SHELF ROUTERS

(75) Inventors: Joseph Harold Steinmetz, Roseville, CA (US); Murthy Kompella, Roseville, CA (US); Matthew Paul Wakeley, Roseville, CA (US)

(73) Assignee: Sierra Logic, Roseville, CA (US)

( * ) Notice: Subject to any disclaimer, the term of this patent is extended or adjusted under 35 U.S.C. 154(b) by 485 days.

(21) Appl. No.: 10/830,419

(22) Filed: Apr. 22, 2004

(65) Prior Publication Data

US 2005/0022064 A1    Jan. 27, 2005

Related U.S. Application Data

(63) Continuation-in-part of application No. 10/822,228, filed on Apr. 8, 2004, now abandoned, which is a continuation-in-part of application No. 10/602,529, filed on Jun. 23, 2003, which is a continuation-in-part of application No. 10/341,835, filed on Jan. 13, 2003, now abandoned.

(51) Int. Cl.
*G06F 11/00* (2006.01)
(52) U.S. Cl. .......................................... 714/4; 370/216
(58) Field of Classification Search .................... 714/4; 370/216
See application file for complete search history.

(56) References Cited

U.S. PATENT DOCUMENTS

| | | | |
|---|---|---|---|
| 5,600,784 A | 2/1997 | Bissett et al. | |
| 5,644,700 A * | 7/1997 | Dickson et al. | 714/9 |
| 6,023,772 A | 2/2000 | Fleming | |
| 6,282,670 B1 | 8/2001 | Rezaul Islam et al. | |
| 6,920,580 B1 * | 7/2005 | Cramer et al. | 714/4 |
| 2003/0158933 A1 * | 8/2003 | Smith | 709/224 |
| 2004/0199618 A1 * | 10/2004 | Knight et al. | 709/223 |
| 2005/0201386 A1 * | 9/2005 | Thompson | 370/395.52 |

* cited by examiner

*Primary Examiner*—Yolanda L Wilson
(74) *Attorney, Agent, or Firm*—Olympic Patent Works, PLLC

(57) ABSTRACT

Embodiments of the present invention include a storage-shelf-router-to-disk-drive interconnection method within a high-availability storage shelf amenable to dynamic reorganization in order to ameliorate error conditions that arise within the high-availability storage shelf. In one embodiment, each path-controller card within the storage shelf is interconnected to two storage-shelf routers on separate storage-shelf-router cards via two serial management links and two serial data links. Different types of errors that may arise within the storage shelf are carefully classified with respect to a number of different error-handling techniques, including local path failovers, single path failovers, error reporting and logging, and other types of error handling techniques. In many implementations, particular error handling methods are conifigurably associated with particular errors, in order to adapt error behavior in a storage shelf to the needs and requirements of a system that includes the storage shelf. Additional embodiments of the present invention concern detection and diagnosis of errors, in addition to handling errors that arise within a storage shelf.

19 Claims, 38 Drawing Sheets

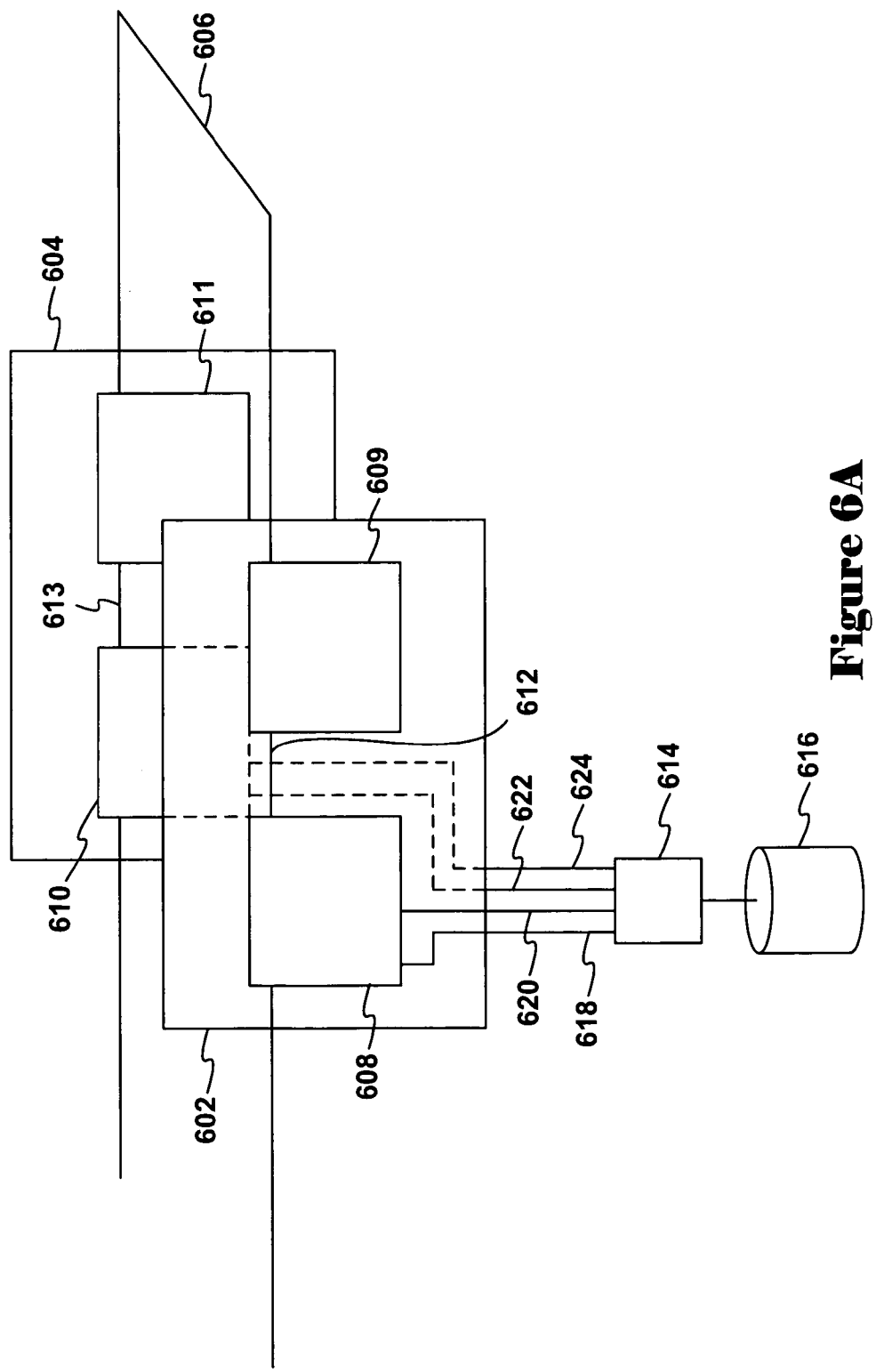

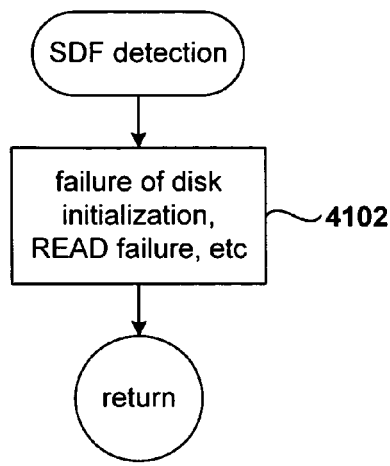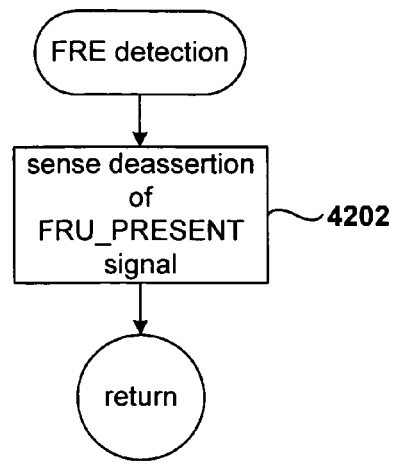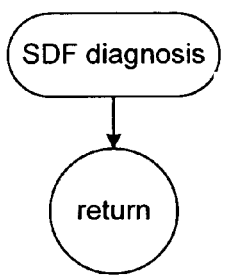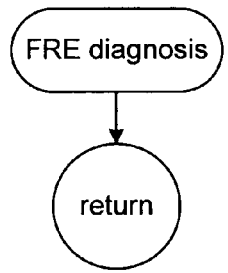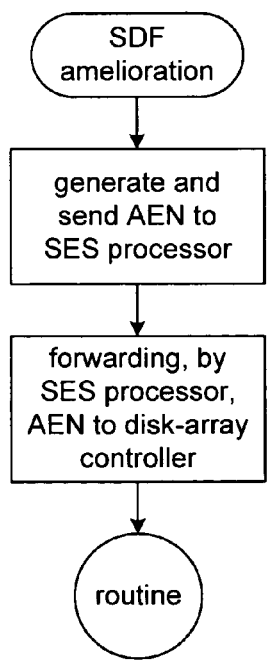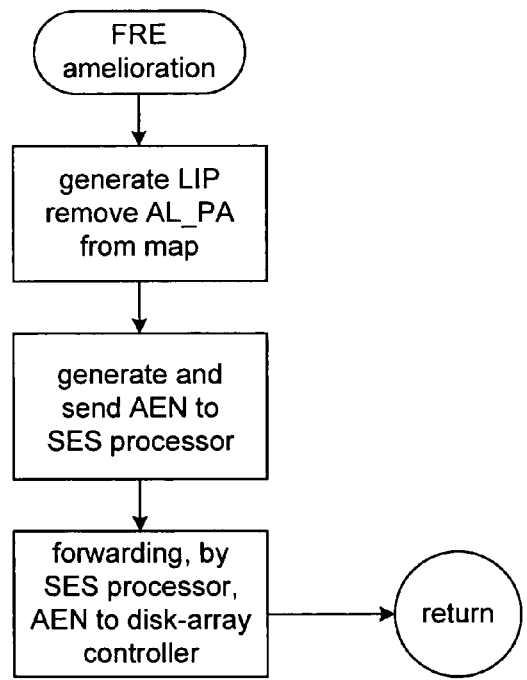

MANAGEMENT OF ERROR CONDITIONS IN HIGH-AVAILABILITY MASS-STORAGE-DEVICE SHELVES BY STORAGE-SHELF ROUTERS

CROSS REFERENCES

This application is a continuation-in-part of U.S. application Ser. No. 10/822,228, filed Apr. 8, 2004, now abandoned which is a continuation-in-part of U.S. application Ser. No. 10/602,529, filed Jun. 23, 2003, which is a continuation-in-part of U.S. application Ser. No. 10/341,835, filed Jan. 13, 2003 now abandoned.

TECHNICAL FIELD

The present invention relates to disk-arrays and other mass-storage-devices composed of numerous individual mass-storage-devices and, in particular, to error-and-event detection, diagnosis, and handling by a storage-shelf router for errors occurring within the storage-shelf router and within high bandwidth communications media, path-controller cards, and mass-storage-devices interconnected with the storage-shelf router.

BACKGROUND OF THE INVENTION

The current application is a continuation-in-part application of U.S. application Ser. No. 10/822,228, filed Apr. 8, 2004, which is a continuation-in-part application of U.S. application Ser. No. 10/602,529, "Integrated-Circuit Implementation Of A Storage-Shelf Router And A Path Controller Card For Combined Use In High-Availability Mass-Storage-Device Shelves That May Be Incorporated Within Disk-Arrays," herein incorporated in its entirety by reference, which is a continuation-in-part application of U.S. application Ser. No. 10/341,835. U.S. application Ser. No. 10/602,529 ("parent application"), which is a continuation-in-part application of U.S. application Ser. No. 10/341,835, includes extensive background information related to the storage-shelf router, path-controller cards, and high-availability storage shelf in which the described embodiment of the current invention is implemented. The parent application, in addition, includes extensive background information on fibre channel ("FC"), the small computer systems interface ("SCSI"), advanced technology attachment ("ATA") disk drives, and serial ATA ("SATA") disk drives.

FIG. 1 illustrates an exemplary, high availability, storage shelf. More detailed illustrations and descriptions are available in the parent application. In FIG. 1, a number of SATA disk drives 102-117 are located within a storage shelf. Each SATA disk drive is accessed via one or both of an x-fabric FC link 120 and a y-fabric FC link 122. Data and control information directed to the SATA disk drives by a disk array controller via the x-and-y-fabric FC links 120 and 122 are received by two storage-shelf-router cards ("SR card") 124 and 126 and routed to individual SATA disk drives 102-117. The SR cards 124 and 126 receive data and command responses from the SATA disk drives 102-117 and transmit the data and command responses to a disk-array controller via the x-and-y FC links 120 and 122. In the exemplary storage shelf 100, each SR card 124 and 126 includes two integrated-circuit storage-shelf routers ("SRs"), with SR card 124 including SRs 128 and 130 and SR card 126 including SRs 132 and 134. Each SATA disk drive is interconnected via a single serial communications link to a path-controller card. For example, SATA disk drive 114 is interconnected via a single serial communications link 136 to a path-controller card ("PC card") 138. The PC cards are each, in turn, interconnected with two SRs via two serial SATA links and two serial management links, discussed with reference to subsequent figures, below. The SRs 128, 130, 132, and 134 are each interconnected with one or more $I^2C$ buses through with the SRs can transmit asynchronous event notifications ("AENs") to entities external to the storage-shelf via a SCSI enclosure services ("SES") processor.

The high-availability storage shelf 100 illustrated in FIG. 1 employs embodiments of the SRs and PC cards that together represent embodiments of the invention disclosed in the parent application. As discussed, in detail, in the parent application, this exemplary high-availability storage shelf allows a large number of less expensive SATA disk drives to be incorporated within disk arrays designed to accommodate FC disk drives. The exemplary embodiment is but one of many possible embodiments of the invention disclosed in the parent application. A storage shelf may contain, for example, a single SR, multiple SRs that each reside on a single SR card, multiple SRs contained on a single SR card, and multiple SRs contained on each of multiple SR cards. Embodiments of the present invention are applicable to any of these storage-shelf embodiments.

An important problem that arises in using SATA disk drives within a FC-based disk array is that FC disk drives are dual ported, while SATA disk drives are single ported. A disk-array controller designed for an FC-based disk array expects disk drives to have redundant ports, so that each disk drive remains accessible despite a single-port or single-path failure. Disk-array and disk-array-component designers and manufacturers have recognized a need for an interconnection scheme and error-and-event detection, diagnosis, and handling methodologies to allow less expensive SATA disk drives to be incorporated within FC-based disk-arrays without extensive modification of FC-based disk-array controller implementations, SATA disk drives, and SATA disk-drive controllers.

SUMMARY OF THE INVENTION

One embodiment of the present invention is a storage-shelf-router-to-disk-drive interconnection method within a high-availability storage shelf amenable to dynamic reorganization in order to ameliorate error conditions that arise within the high-availability storage shelf. In this embodiment, each path-controller card within the storage shelf is interconnected to two storage-shelf routers on separate storage-shelf-router cards via two management links and two data links. Different types of errors and events that may arise within the storage shelf are classified with respect to a number of different error-handling and event-handling techniques. For one class of errors and events, the disk drives interconnected via primary data and management links to a storage-shelf router are failed over to a second storage-shelf router to which the disk drives are interconnected via secondary management and data links. Thus, one of two storage-shelf routers assumes management and communications responsibilities for all of the disk drives, which are normally by two storage-shelf routers, each having primary responsibility for half of the disk drives. Another class of errors and events may result in a single path fail over, involving failing over a single disk drive from primary interconnection with one storage-shelf router to primary interconnection with another storage-shelf router. Additional classes of errors and events are handled by other methods, including reporting errors to an external entity, and optionally logging the errors to flash memory, for handling by external entities including disk-array controllers and storage-shelf-monitoring external processors. In many implementations, particular error-handling and event-handling methods may be configurably associated with particular errors and events, in order to adapt error-related and event-related behavior in a storage shelf to the needs and requirements of a system that includes the storage shelf. Additional embodiments of the present invention concern detection and diagnosis of errors and events, in addition to handling errors and events that arise within a storage shelf.

BRIEF DESCRIPTION OF THE DRAWINGS

FIGS. 6A-C illustrate the failure domains and recognized failure points for a hypothetical two-storage-router-card storage-shelf implementation.

FIGS. 41A-C provide control-flow diagrams illustrating SDF detection, diagnosis, and handling.

FIGS. 42A-C provide control-flow diagrams illustrating FRE detection, diagnosis, and handling.

DETAILED DESCRIPTION OF THE INVENTION

One embodiment of the present invention is a method for interconnecting SATA disk drives with storage-shelf routers ("SRs") to allow various error conditions and events arising within a storage-shelf to be handled through reconfiguration of the SR-to-path-controller-card interconnections. This embodiment of the invention also includes a method for classifying the various types of errors and events that may arise within the storage shelf into error-and-event classes that are each handled by a different method, so that, for example, a disk-array controller designed to control FC disk drives within a disk array can control the SATA disk drives within the storage shelf without significant modification or reimplementation. Storage-shelf behavior under recognized error and event conditions lies within a range of error-and-event-elicited behaviors expected by a disk-array controller of an FC-based disk array. Although the present invention is described with reference to the exemplary storage shelf illustrated in FIG. 1, the present invention is applicable to many different storage-shelf configurations. For example, the present invention is applicable to a storage shelf containing two, single-SR cards, and to a storage shelf including more than four, two- or four-storage-shelf-router SR cards.

Figure 1:
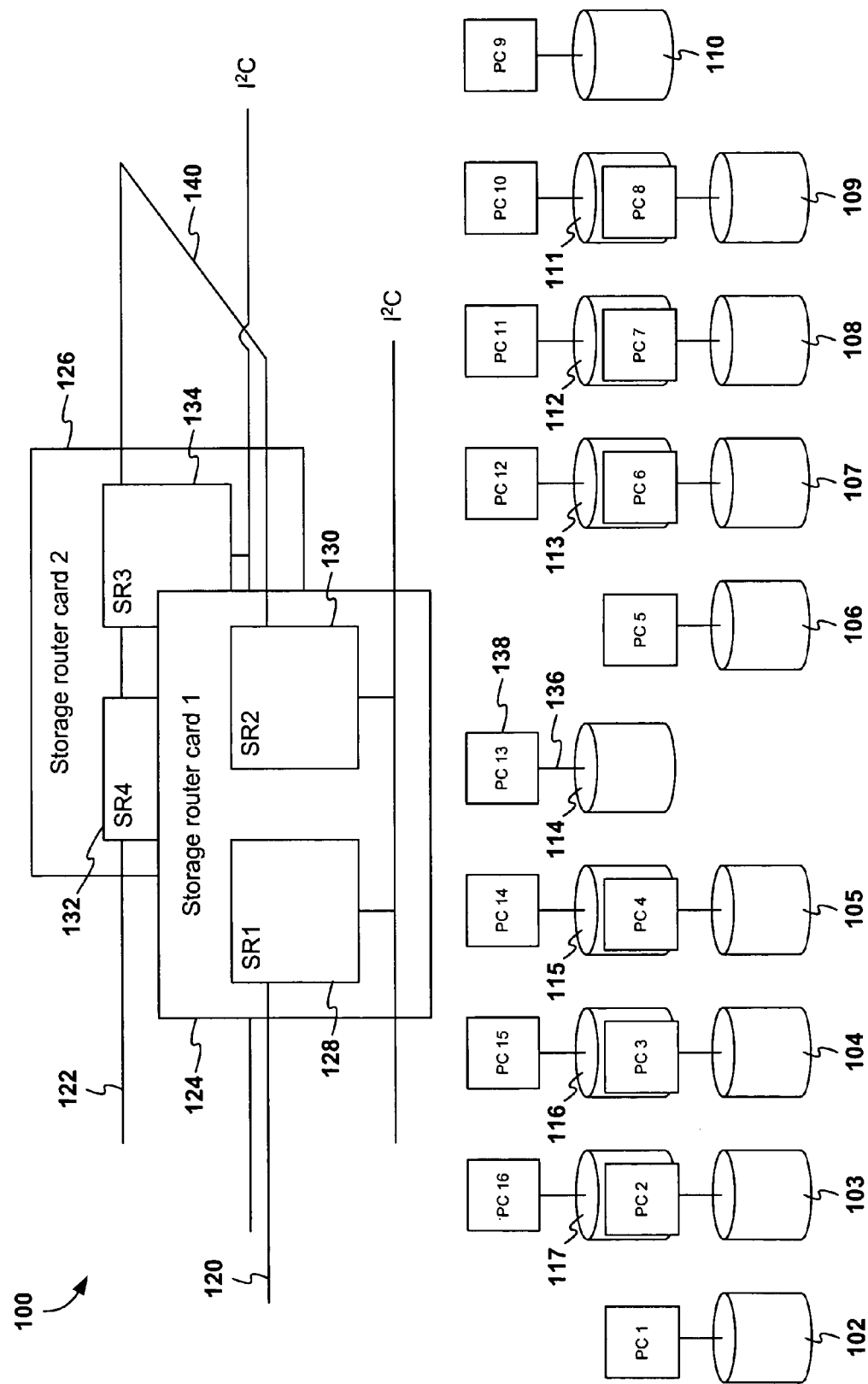
FIG. 1 illustrates an exemplary, high availability, storage shelf.
Figure 2:
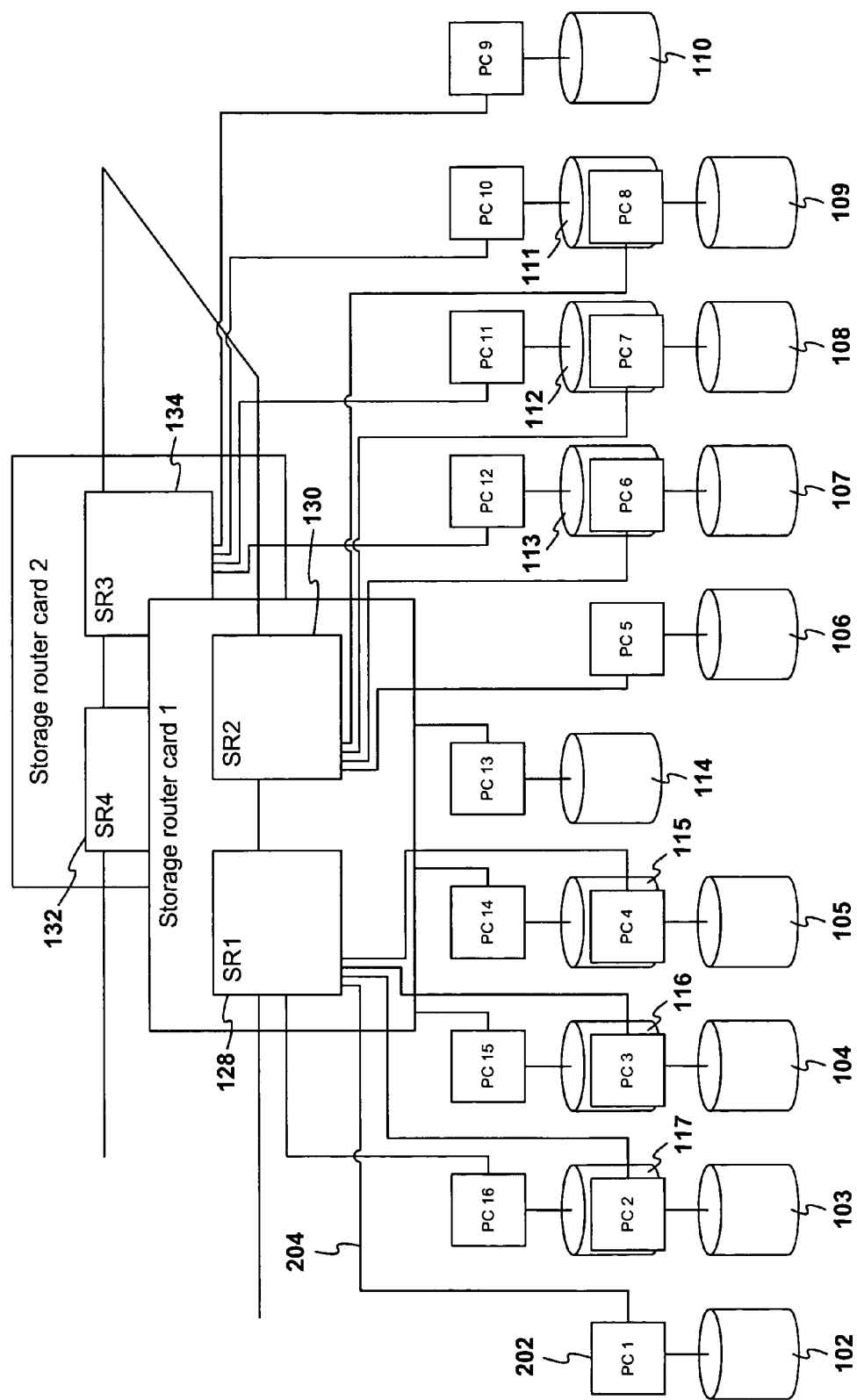
FIG. 2 illustrates the interconnection architecture within a storage-shelf employing an embodiment of the present invention.

FIG. 2 illustrates the interconnection architecture within a storage shelf employing an embodiment of the present invention. FIG. 2 employs the same illustration conventions employed in FIG. 1, as do subsequently discussed FIGS. 3-5. In the interest of brevity and clarity, descriptions of the various components of the storage shelf are not repeated, and the same numerical labels used in FIG. 1 are used in FIGS. 2-5.

In FIG. 2, a single link, or path, is shown between each path controller ("PC") and the SR having primary responsibility for managing the PC. For example, the PC 202 interconnected with SATA disk drive 102 is linked to SR 128 via path 204. The single-link representation of the path 204 in FIG. 2 is employed for clarity purposes. In fact, this single-link illustration convention represents two separate serial links, a management link and a SATA data link. As can be seen in FIG. 2, primary control of the SATA disk drives and corresponding PCs are partitioned among the four SRs 128, 130, 132, and 134, each SR having primary control of four SATA disk drives. In a preferred embodiment, each SR has primary control of eight SATA disk drives in a 32-drive storage shelf. Four SATA disk drives are shown connected to each SR in FIG. 2, and in subsequent figures, for clarity of illustration. Thus, as shown in FIG. 2, SR 128 has primary control of SATA disk drives 102-105, SR 130 has primary control of SATA disk drives 106-109, SR 134 has primary control of SATA disk drives 110-113, and SR 132 has primary control of SATA disk drives 114-117.

Figure 3:
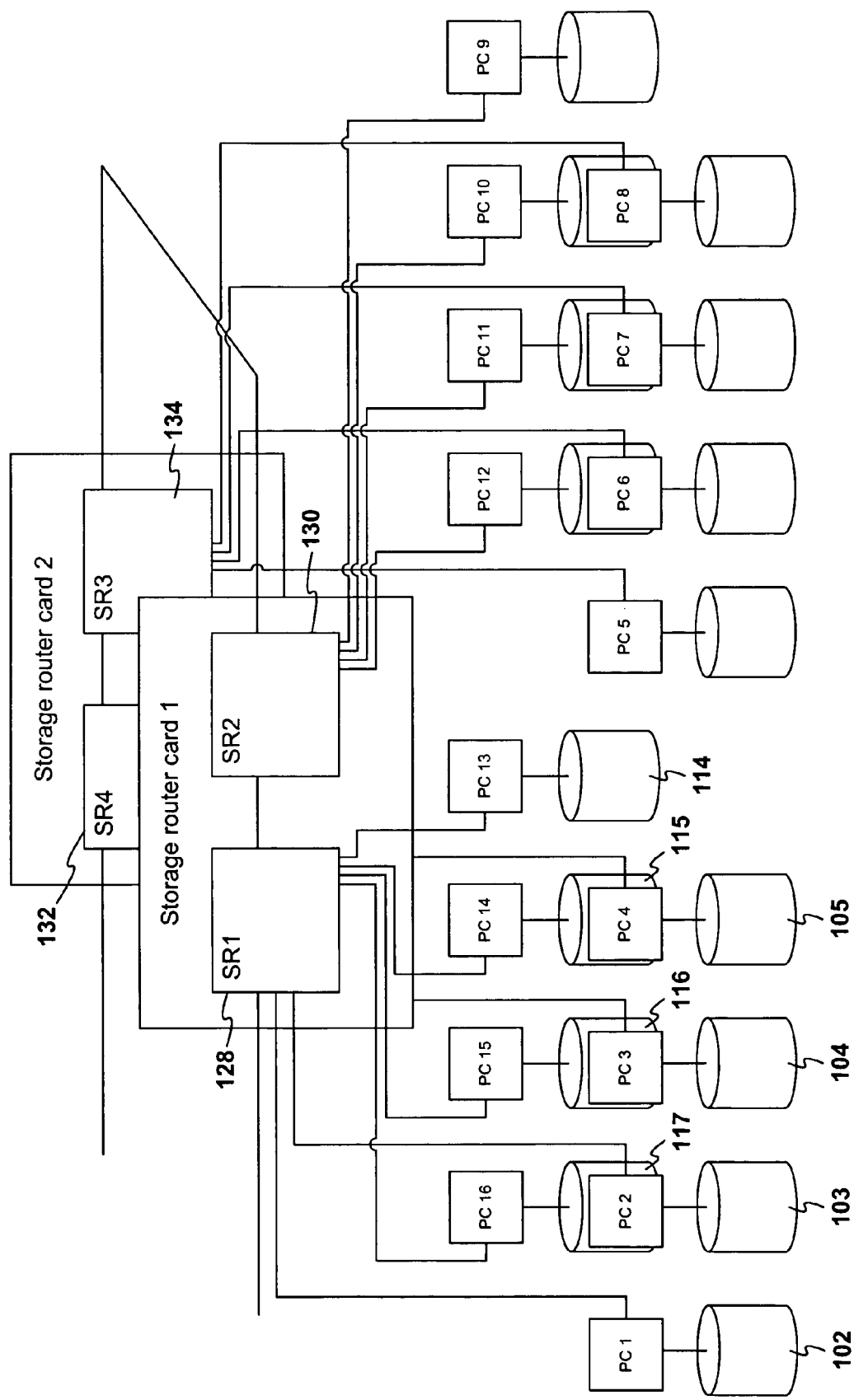
FIG. 3 shows secondary links, or paths, between the storage-shelf routers and path-controller cards of the exemplary of the storage shelf, according to one embodiment of the present invention.

FIG. 3 shows secondary links, or paths, between the SRs and PC cards of the exemplary storage shelf, according to one embodiment of the present invention. FIG. 3 uses the same illustration conventions as used in FIG. 2. Note, as shown in FIG. 3, that SR 128 has secondary paths to SATA disk drives 114-117, which are under primary control of SR 132, as shown in FIG. 2. SR 132 correspondingly has secondary links to SATA disk drives 102-105, which are under primary control of SR 128, as shown in FIG. 2. Similarly, SR 130 has secondary paths to the SATA disk drives under primary control of SR 134, and SR 134 has secondary paths to the SATA disk drives under primary control of SR 130. Thus, each SATA disk drive is under primary control of one SR on a first SR card, and has secondary management and data-path links to a peer SR on the other SR card.

Figure 4:
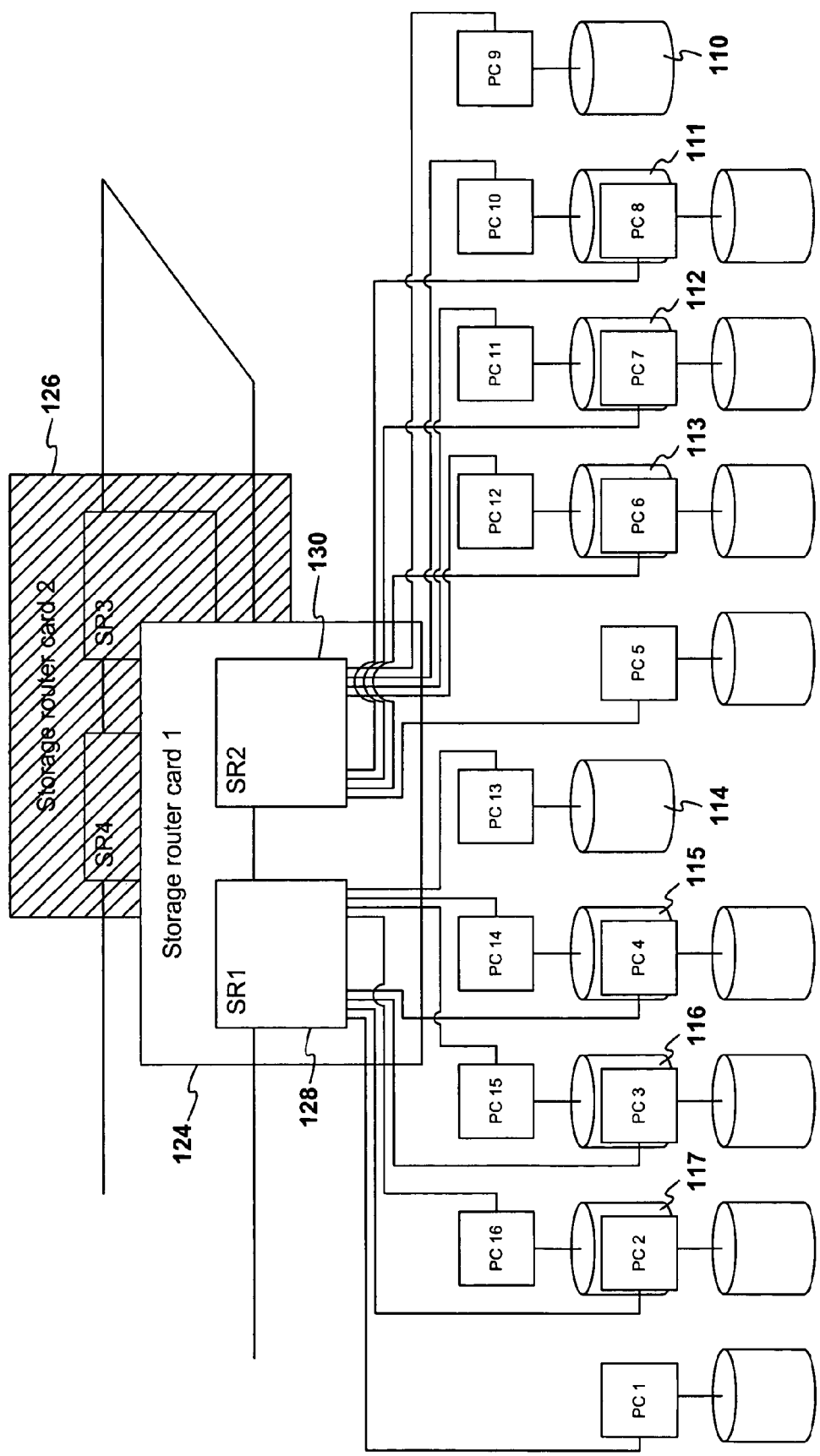
FIG. 4 illustrates a local path fail over.

FIG. 4 illustrates a local path fail over. FIG. 4 employs the same illustration conventions are FIGS. 1 and 2. In FIG. 4, SR card 126 has abandoned, or lost, primary control of all of SATA disk drives 110-117 that it originally had primary control over, as shown in FIG. 2. In FIG. 4, the SRs of SR card 124 now have assumed primary control of all sixteen SATA disk drives. The situation illustrated in FIG. 4 represents the results of a local path fail over ("LPFO"). An LPFO may be undertaken in response to various different types of errors and events that may arise within the storage-shelf. For example, if the SRs on SR card 126 fail, or SR card 126 is manually removed from the storage shelf, then the absence of a working SR card 126 can be detected by the SRs on SR card 124, and these two SRs 128 and 130 can assume primary control over those SATA disk drives with which they are connected via secondary management and data links. An LPFO enables an external entity, such as a disk-array controller, to continue to access all sixteen SATA disk drives despite failure or removal of one of the two SR cards. Note that the SR-to-PC interconnection scheme, shown in FIG. 2, provides an approximately equal distribution, or partitioning, of SATA disk drives among the four SRs so that management tasks are balanced among the SRs, and ensures that, in the event of an SR-card failure, all SATA disk drives remain accessible to external entities via the fibre channel.

The architecture of the PC cards is described, in detail, in the parent application. Each PC card provides four serial ports needed to interconnect the PC card to the primary, lower-speed management and primary, higher-speed SATA data links and to the secondary, lower-speed management and secondary, higher-speed SATA data links. The PC card includes a 2:1 multiplexer that allows data to be accepted by the PC card from either the primary data link or the secondary data link, but not concurrently from both. It is the inability of the PC card to concurrently route data from both primary and secondary data links to the SATA disk drives that motivates the local path fail over ("LFPO") strategy. When an error or event occurs that compromises or inactivates one of the two SR cards, the remaining, active SR card needs to employ secondary management links to switch the PC card to receiving and transferring data to the SATA disk drive via the secondary SATA data link or, in other words, to fail over the PC card and corresponding SATA disk drive from the former, primary SATA link and primary management link to the secondary SATA and management links. In a reverse process, a recovered or newly inserted, properly functioning SR can request that data links failed over to another SR card be failed back to the recovered or newly inserted SR, a process appropriately referred to "local path fail back" ("LPFB").

Figure 5:
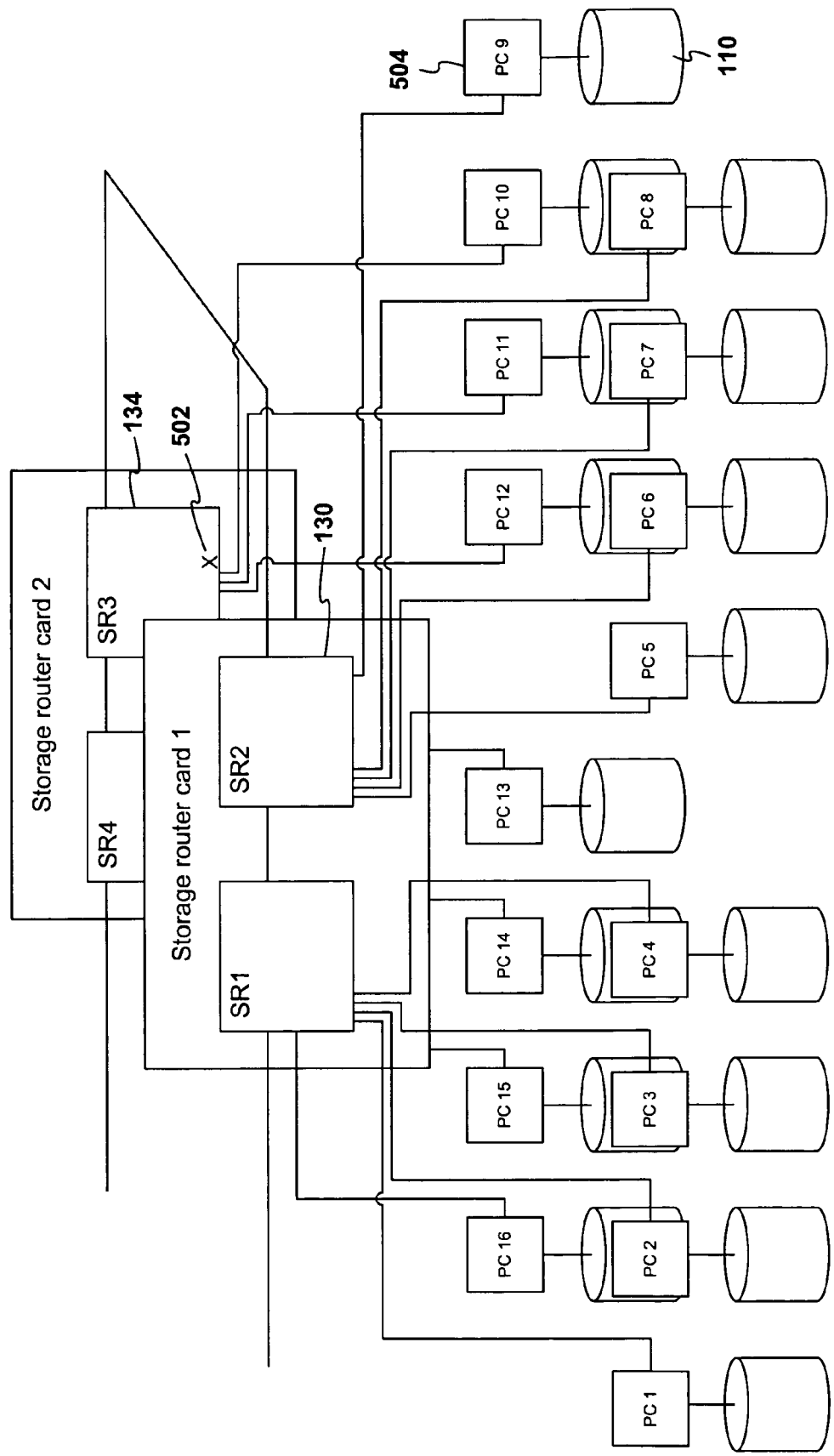
FIG. 5 illustrates a single path fail over.

FIG. 5 illustrates a single path fail over. FIG. 5 illustrates a second error-and-event-handling strategy involving reconfiguration of interconnections between SRs and PC cards. In FIG. 5, a port 502 on SR 134 has failed. In this case, the single primary link between SR 134 and PC card 504 corresponding to the failed port has been failed over to SR 130, which now has primary control over PC card 504 and the corresponding SATA disk drive 110. This process is referred to as a single path fail over ("SPFO"). A storage shelf may allow a disk-array controller to direct SPFOs and LPFOs, or may, instead, undertake SPFOs and LPFOs in order to automatically handle error conditions.

Figure 6B:
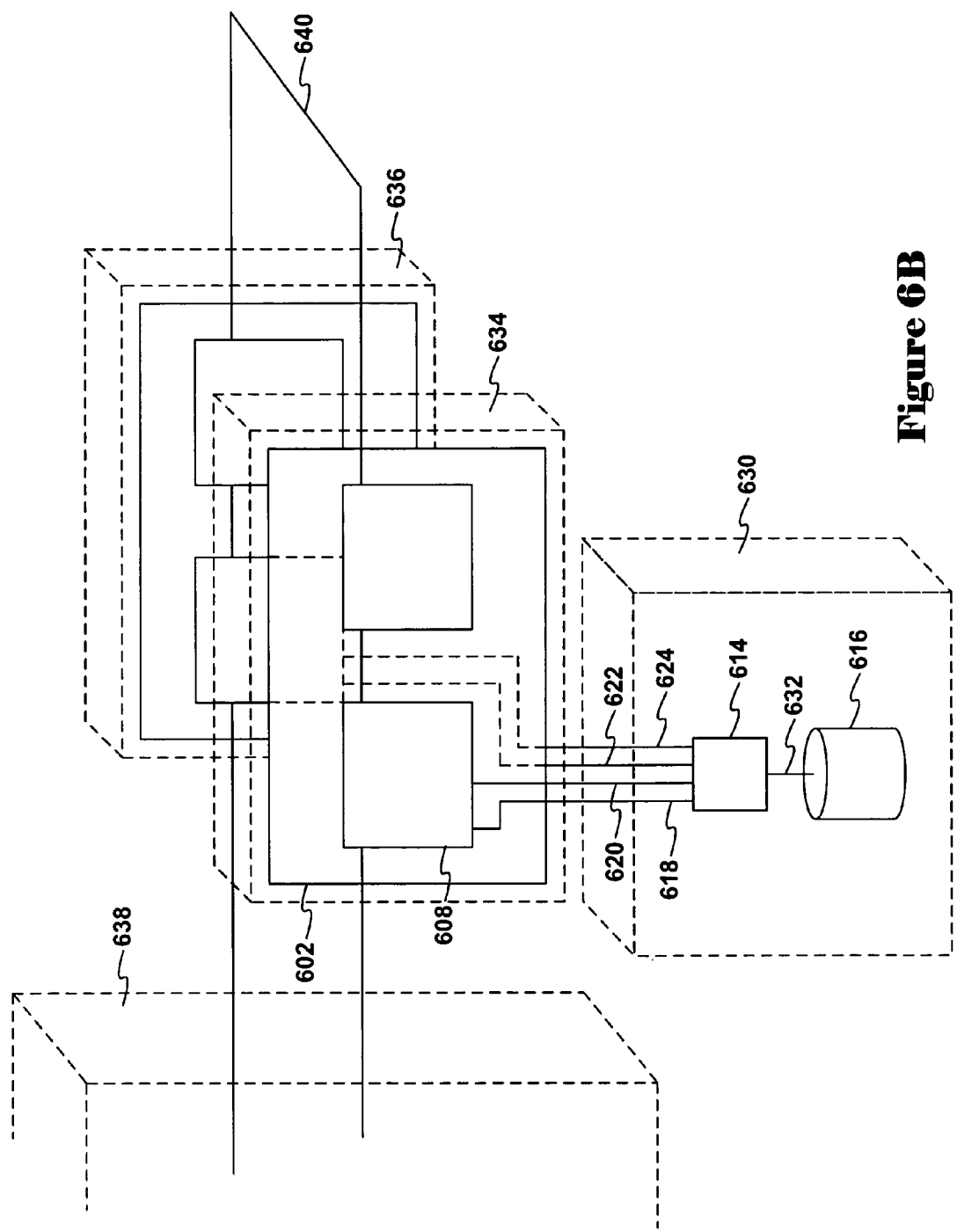
Figure 6C:
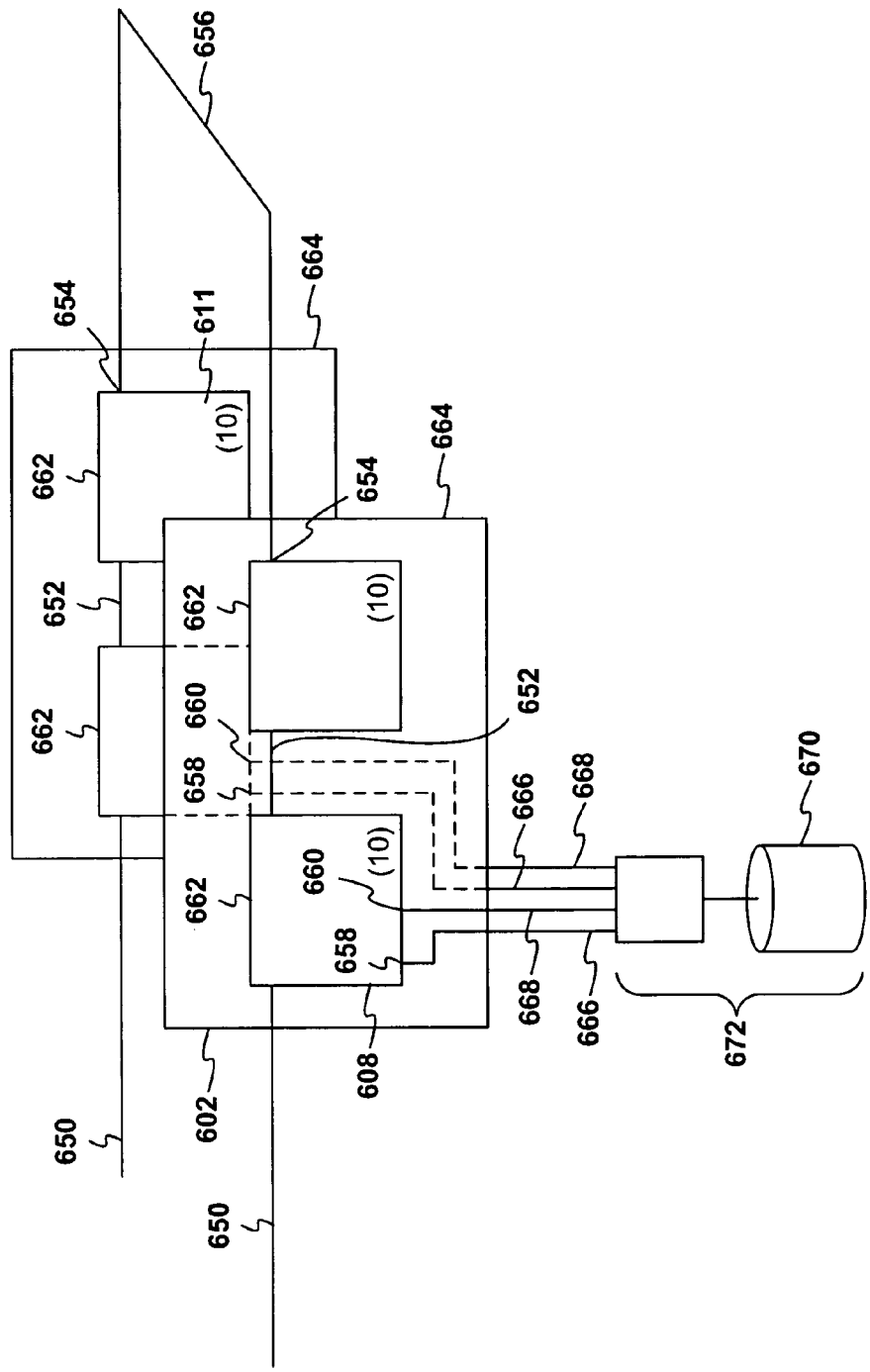

FIGS. 6A-C illustrate the failure domains and failure points for a hypothetical two-SR-card storage-shelf implementation. FIG. 6A shows two SR cards 602 and 604 interconnected by a fiber channel 606 communications medium (intra-card link), each card having two SRs 608-609 and 610-611, respectively, interconnected by intra-card links 612 and 613 that are card-resident portions of the fiber channel medium 606. As discussed above, and in the parent application, the SRs control PC cards that each provides a dual ported connection to an SATA disk drive. In FIG. 6A, and in FIGS. 6B-C that follow, a single PC card 614 linked to a single SATA drive 616 is shown, connected to SR 608 via a primary SATA link 618 and a primary management link 620 and to SR 610 via a secondary SATA link 622 and a secondary management link 624. Only a single PC card is shown, for clarity, although each SR is generally connected to 16 PC cards, in a preferred embodiment.

FIG. 6B illustrates the primary failure domains addressed by the error-and-event detection, diagnosis, and handling methods that represent embodiments of the present invention. A first failure domain 630 includes the SATA disk-drive carrier that includes a PC card 614, an SATA disk drive 616, and various communications links connections and ports. A second failure domain, two of which 634 and 636 are shown in FIG. 6B, includes the printed circuit board and attached components of an SR card, including communications links and ports. This failure domain includes the SRs, intra-card and inter-card communications links, a system-enclosure-services processor ("SES processor"), and other components of an SR card. A final failure domain 638 includes the disk-array controller, or other external device controlling a storage shelf that includes the SR cards and SATA disk drives belonging to the first two failure domains, as well as communications media, power sources, processing and data storage components, and other system components. The final failure domain 638 is considered to be external to a storage shelf, and errors and events occurring in this failure domain are handled by external processing elements, including the disk-array controller, using methods not addressed by embodiments of the present invention.

There are a number of ambiguous inter-domain failure areas within the failure-domain layout shown in FIG. 6B. For example, the primary and secondary SATA links and management links 618, 620, 622, and 624 lie between failure domains 630 and 634 and 636, and the inter-card portion of the FC medium 640 lies between failure domains 634 and 636. Both inter-domain failure regions reside within a back plane into which the SR cards and PC cards plug, and is therefore typically a passive, low-probability-of-failure medium. In certain cases, backplane and link errors may be unambiguously detected and diagnosed, while, in other cases, backplane-related errors may give rise to ambiguous error conditions.

FIG. 6C illustrates certain of the specific failure points and event domains dealt with by the error-and-event detection, diagnosis, and recovery methods that represent embodiments of the present invention. These failure points and event domains include: (1) external FC link failure ("EFCLF"), a failure in the external FC links 650 up to the SR, including the FC port interconnected with the external FC links and other SR card components interconnected to the FC; (2) internal link failure ("ILF"), a failure in the intra-card communications medium 652, including the internal FC communications medium on the SR card as well as the FC ports of the SRs interconnected by the links; (3) inter-card port failure ("ICPF"), a failure of an FC port interconnected to the inter-card FC medium 656; (4) inter-card link failure ("ICLF"), a failure in the FC medium interlinking the two cards 656; (5) SATA port failure 658; (6) management port failure ("MPF"), a failure in a management link port 660; (7) uncontrolled critical failure ("UCF"), an unexpected failure of the firmware or hardware of an SR 662; (8) controlled critical failure ("CCF"), an error condition detected by an SR 662 via an assert, panic, or other mechanism, leading to a controlled failure of the SR; (9) peer field replaceable unit ("FRU") removal ("PFR"), removal of an SR card 664 from the storage shelf; (10) I²C port failure ("I2CF"), a failure of an I²C port I²C link or within an SR card 664; (11) FRU insertion fail back ("FBE"), insertion of an SR card 664 into a storage shelf; (12) SATA link failure ("SLF"), failure of a primary or secondary SATA link 666; (13) SATA management link failure ("MLF"), failure of a primary or secondary SATA management link 668 within the disk-drive-carrier domain; (14) SATA drive failure ("SDF"), failure of the SATA disk drive 670; (15) drive-FRU removal ("FRE"), removal of a drive-drive canister 672 from the storage shelf, and (16) drive-FRU insertion ("FIE"), insertion of a disk-drive canister 672 into the storage shelf.

Detection, diagnosis, and recovery from each of these different types of failures and events are discussed, in detail, below.

Figure 7:
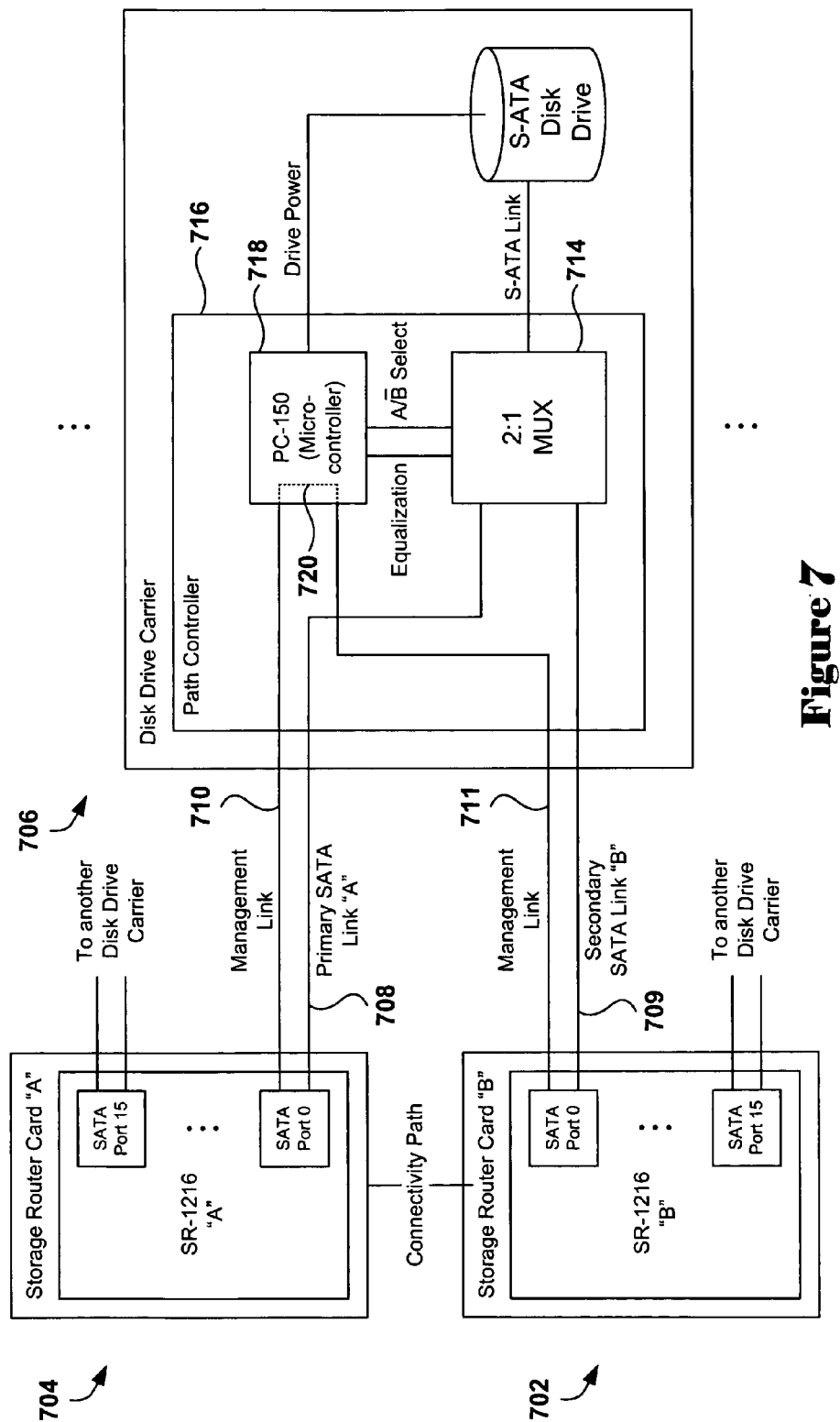
FIG. 7 illustrates the interconnection of a disk-drive carrier, including a path-controller card and SATA drive, with two different storage-shelf routers.

First, additional details regarding internal components of the PC card are provided. FIG. 7 illustrates the interconnection of a disk-drive carrier, including a path-controller card and SATA drive, with two different storage-shelf routers. As shown in FIG. 7, each SR 702 and 704 is interconnected with the disk-drive carrier 706 via an SATA link 708-709 and a management link 710-711. The SR card with primary responsibility for the disk-drive carrier, including the SATA disk drive, is considered to have the primary SATA link 708 and primary management link 710, while the back-up SR is considered to have the secondary SATA link 709 and the secondary management link 711. The 2:1 MUX 714 within the PC card 716 of the disk-drive carrier 706 can be controlled through a PC microcontroller 718 to accept communications either from the primary SATA link or the secondary SATA link. A path fail over involves directing the PC microcontroller via a management link to switch from accepting communications through one of the two SATA links to the other of the SATA links, thus inverting the primary/secondary designations of the SATA links, or, more commonly, switching secondary links to primary links, so that the SR card initially interconnected through secondary links can be removed without disrupting communications between an external processing entity and the SATA disk drives. Note also that there is PC mailbox communications mechanism 720 using the primary management link, the PC microcontroller, and the secondary management link, allowing the two SR cards to communicate with one another through the PC mailbox mechanism. This redundant inter-communications between SR cards allows SR cards to communicate when FC ports or FC links fail. In addition, SATA packets may be looped back to an SR via a secondary link, optionally via the 2:1 MUX.

Figure 8:
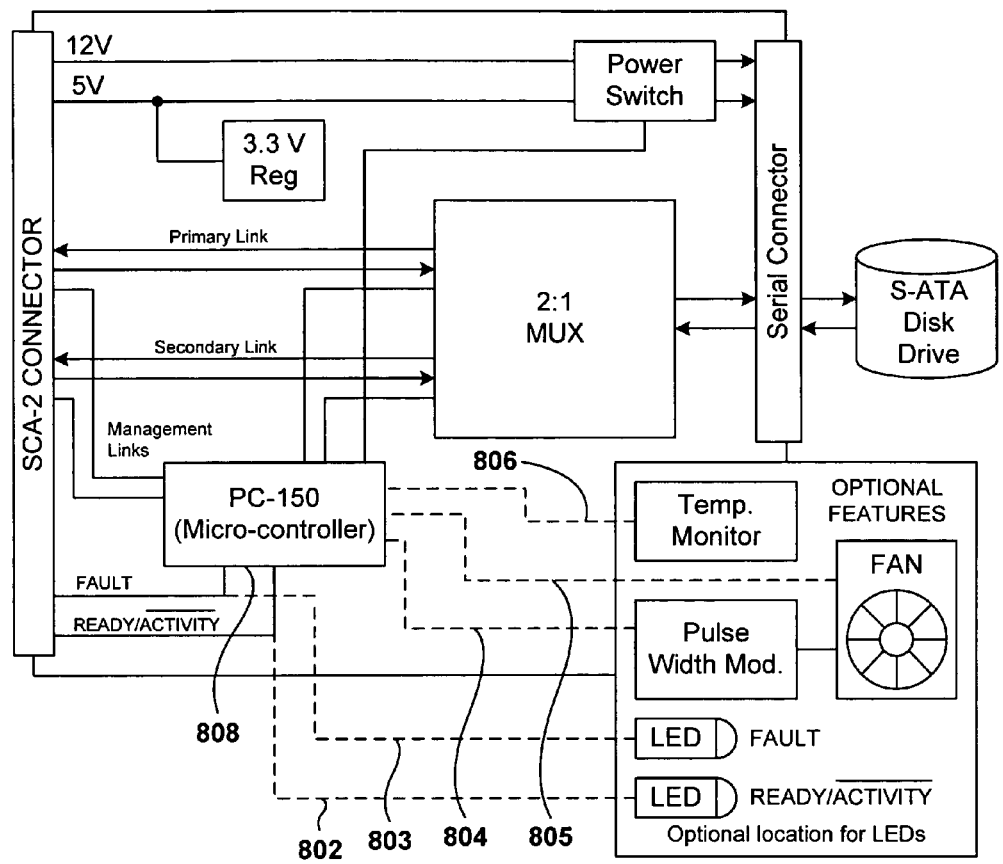
FIG. 8 shows additional details regarding a path-controller card, including various optional links that allow the path-controller microcontroller to control various output signals, such as LED's, on the disk-drive carrier as well as to monitor various environmental conditions within a disk-drive carrier.

FIG. 8 shows additional details regarding a PC card, including various optional links 802-806 that allow the PC microcontroller 808 to control various output signals, such as LED's, on the disk-drive carrier as well as to monitor various environmental conditions within a disk-drive carrier.

Figure 9:
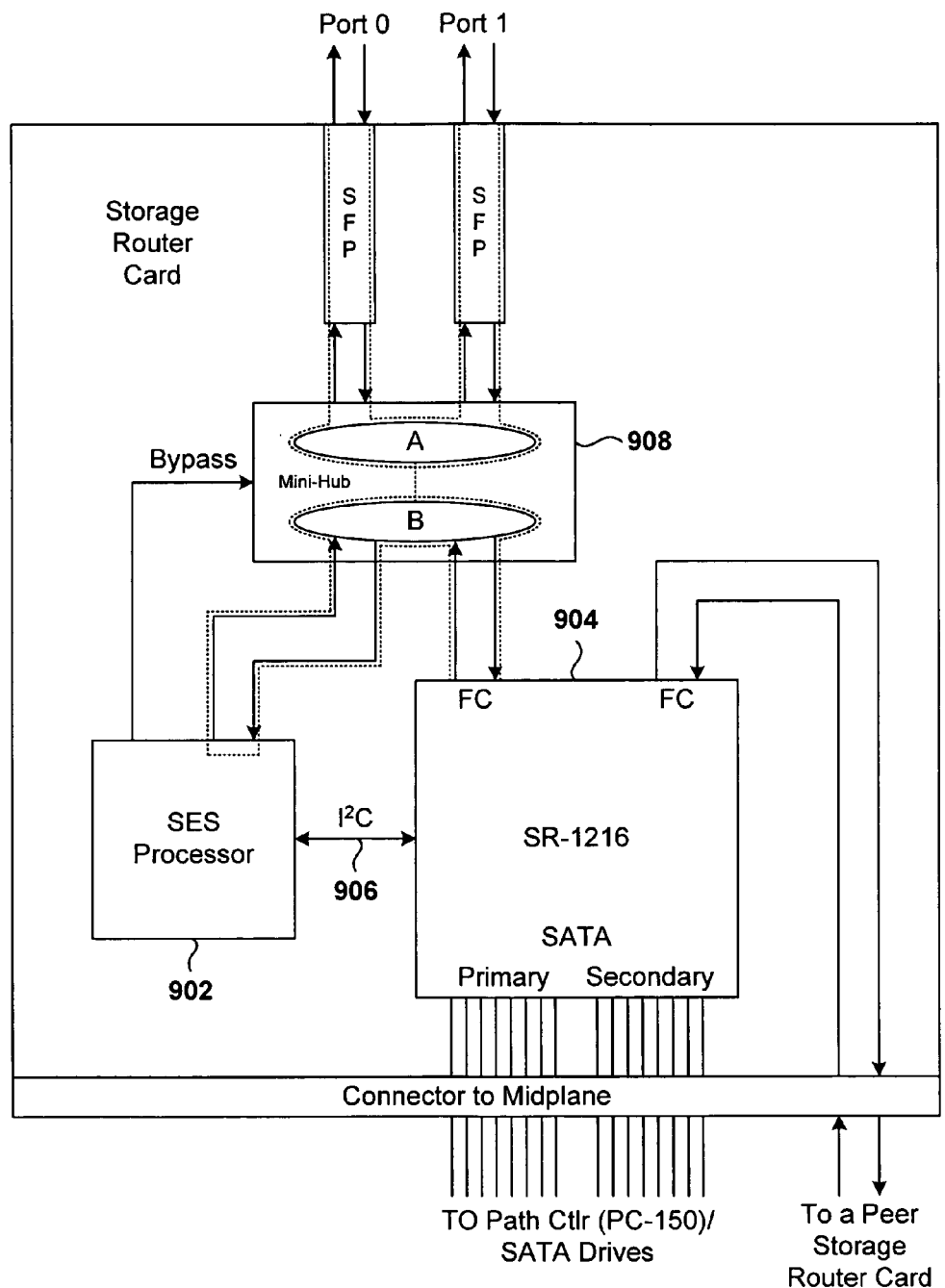
FIG. 9 shows one type of storage-shelf router card embodiment that includes an SES processor interconnected with a storage-shelf router via both an $I^2C$ bus and an internal FC mini-hub.
Figure 10:
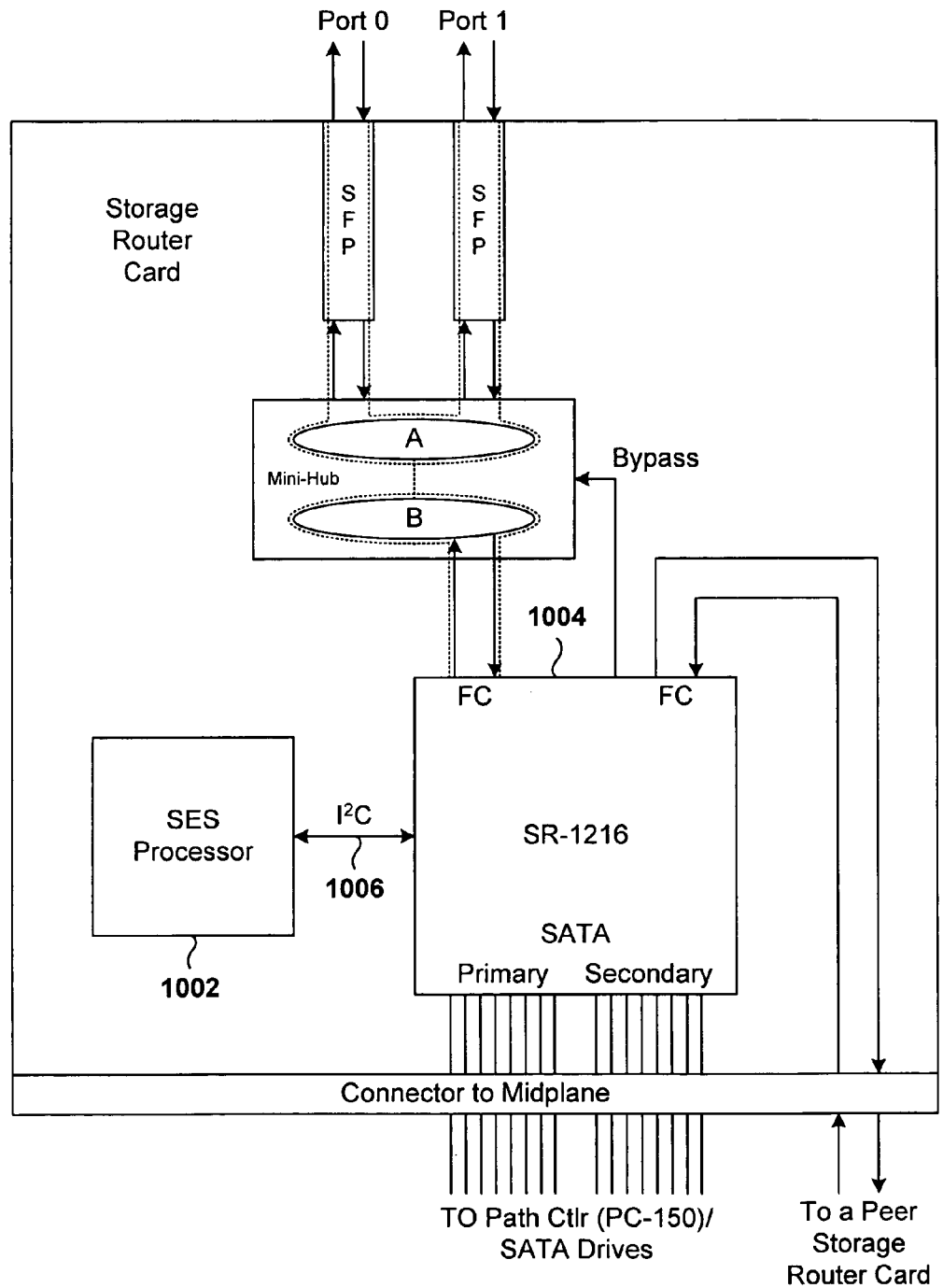
FIG. 10 shows an alternative embodiment of a storage-shelf router card.

FIG. 9 shows one type of SR card embodiment that includes an SES processor interconnected with an SR via both an I²C bus and an internal FC mini-hub. As shown in FIG. 9, the SES processor 902 intercommunicates with an SR 904 on an SR card via an I²C bus 906. The SES processor directly communicates with a disk-array controller via an FC mini-hub 908 to log events and notify the disk-array controller of error conditions. FIG. 10 shows an alternative embodiment of an SR card. In the alternative embodiment, the SES processor 1002 is interconnected with the SR 1004 and FC only through an I²C bus 1006, the disk-array controller communicating to the SES processor via the SR using a proxy mechanism to channel FC traffic for the SES processor using an encapsulated protocol over the I²C bus.

Figure 11:
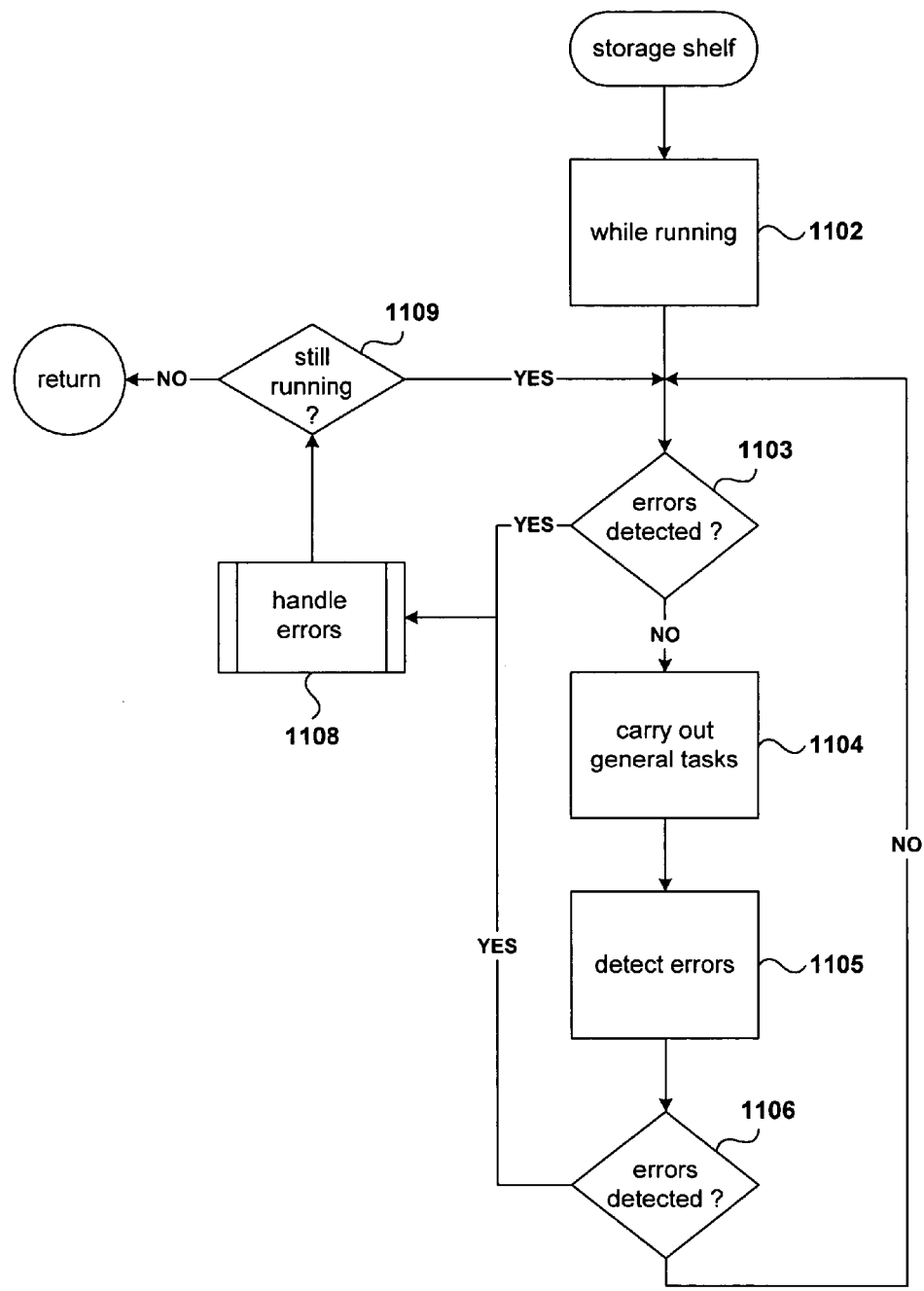
FIG. 11 is a control-flow diagram illustrating general storage-shelf operations.
Figure 12:
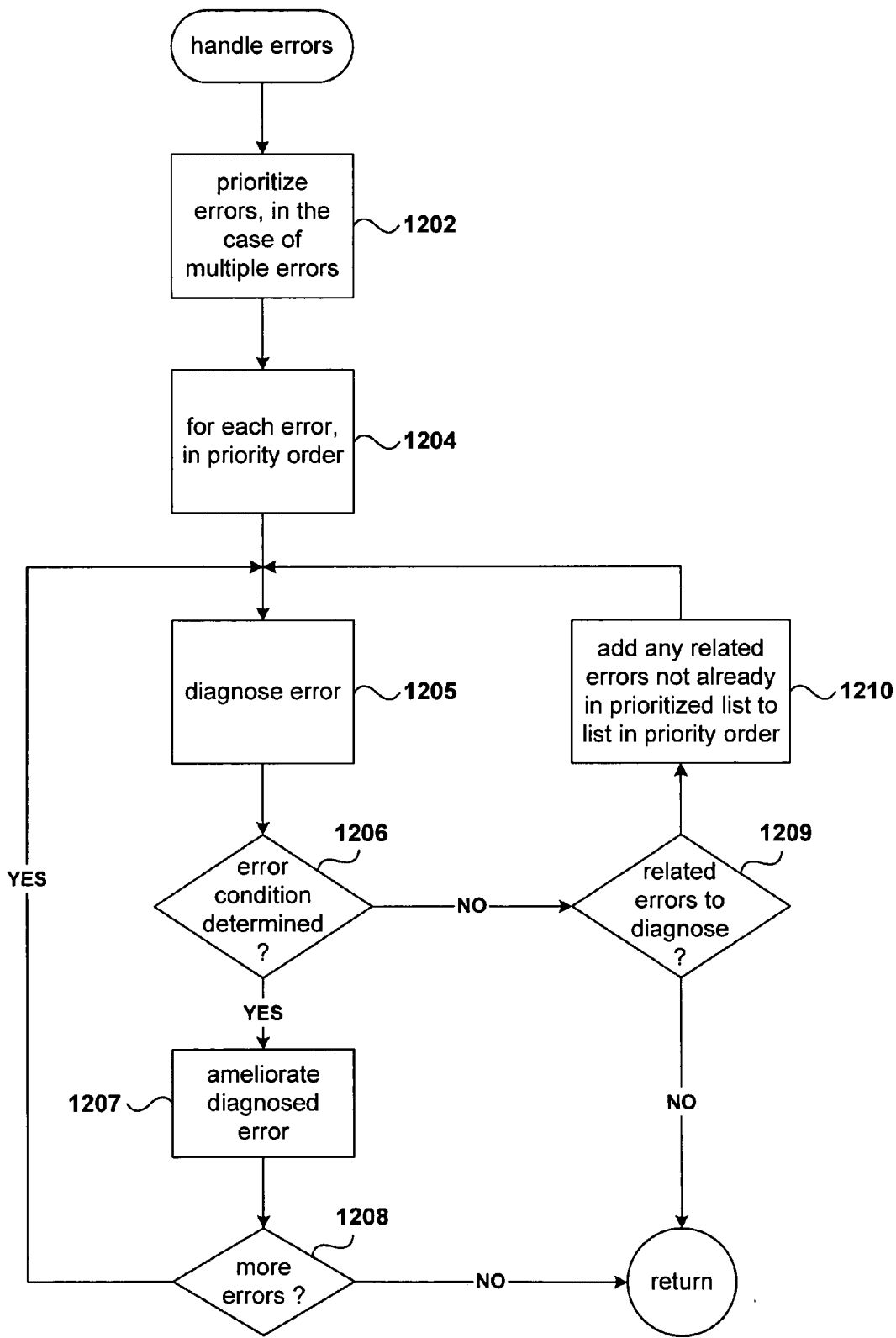
FIG. 12 is a control-flow diagram illustrating an error-handling routine called in step 1108 of FIG. 11.

FIG. 11 is a control-flow diagram illustrating general storage-shelf operations. The control flow shown in FIG. 11 may be assumed to concern a single SR or, more generally, to the coordinated activities of multiple SRs on multiple SR cards within a storage shelf. In different embodiments, coordination between SRs may be alternatively implemented, as may partitioning of control tasks and other processes and operational activities. The general control-flow diagrams of FIGS. 11 and 12 are meant to indicate where, in the overall scheme of storage-shelf operation, particular error-and-event detection, diagnosis, and recovery strategies that represent embodiments of the present invention integrate with overall storage-shelf operations. In FIG. 11, normal storage-shelf operations are represented by an endless while-loop comprising steps 1102-1106. In step 1103, an error or event within the storage shelf is asynchronously detected via an interrupt or other notification mechanism. Note that step 1103 may occur anywhere within the while-loop representing storage-shelf operations. If an error or event is asynchronously detected, in step 1103, then an error-and-event handling routine 1108 is called. Otherwise, the normal activities of the storage shelf are carried out in step 1104. Periodically, during each iteration of the while-loop representing normal storage-shelf operations, an SR synchronously undertakes error-and-event detection, represented by step 1105, to synchronously determine whether any errors or events have arisen. If so, as detected in step 1106, the error-and-event handling routine is called in step 1108. Following error-and-event handling, in step 1108, if the storage shelf or SR is still operating, as detected in step 1109, then the endless while-loop continues. Otherwise, SR operation ceases.

FIG. 12 is a control-flow diagram of the error-and-event handling routine called in step 1108 of FIG. 11. In step 1202, if multiple errors and/or events have been detected, the multiple errors and/or events are prioritized, so that the most important errors can be handled first. Next, in the for-loop of steps 1204-1210, each detected error and/or event from the prioritized error list is handled. First, in step 1205, the detected error and/or event is diagnosed. Next, in step 1206, the error and/or event re-evaluation undertaken in the diagnosis step 1205 is considered to determine whether an error condition or event has actually occurred. If so, then in step 1207, an error-and/or-event handling routine is called to recover from, or handle, the detected and diagnosed error or event. Following error-and/or-event handling, if additional errors and/or events remain on the prioritized error list, as detected in step 1208, then the for-loop continues with a subsequent iteration in step 1205. Otherwise, the for-loop terminates. If, following diagnosis, the detected error condition or event is determined not to have occurred, then, in step 1209, the error-and/or-event handling routine determines whether any related errors and/or events may have occurred. If so, the related errors and/or events are inserted into the prioritized list of errors and/or events, in step 1210, if they are not already in the list, and the for-loop continues at step 1205.

For each type of failure condition illustrated in FIG. 6C, a detection routine, a diagnosis routine, and a handling routine is generally provided. The detection routine indicates a method by which the error or event can be detected either asynchronously, in step 1103 of FIG. 11, or synchronously, in step 1105, of FIG. 11. The diagnosis routine, called in step 1205 of FIG. 12, allows an SR to confirm the detected error or event, determine whether the detected error or event is actually symptomatic of a different error, or to determine that no error condition or event has, in fact, occurred. Finally, the handling routine, is called in step 1207 of FIG. 12 to handle the detected and diagnosed error or event.

Figure 13:
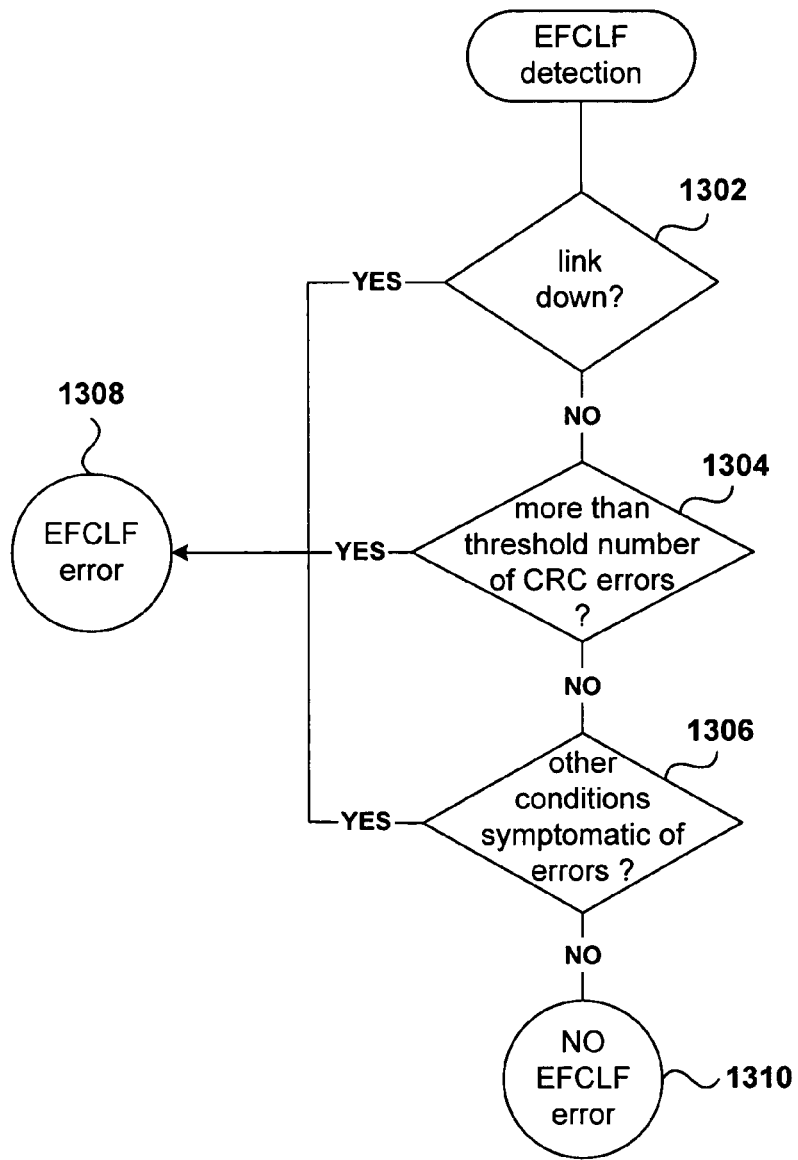
FIG. 13 is a control-flow diagram illustrating EFCLF detection.

FIG. 13 is a control-flow diagram illustrating EFCLF detection. An EFCLF error may be detected, in step 1302, as a link-down event generated by FC hardware within an SR. Alternatively, an EFCLF error may be detected when an SR determines that more than a threshold number of cyclic-redundancy-check ("CRC") errors have occurred within a preceding interval of time, in step 1304. There may be other types of conditions or events that result in an SR considering an EFCLF error to have been detected, as represented by step 1306. If a link-down error, a threshold number of CRC errors, or other such condition is detected by an SR, then an EFCLF error is considered to be detected in step 1308. Otherwise, no EFCLF error is detected, indicated by step 1310. The EFCLF error is generally detected by the SR directly connected to the external FC link.

Figure 14:
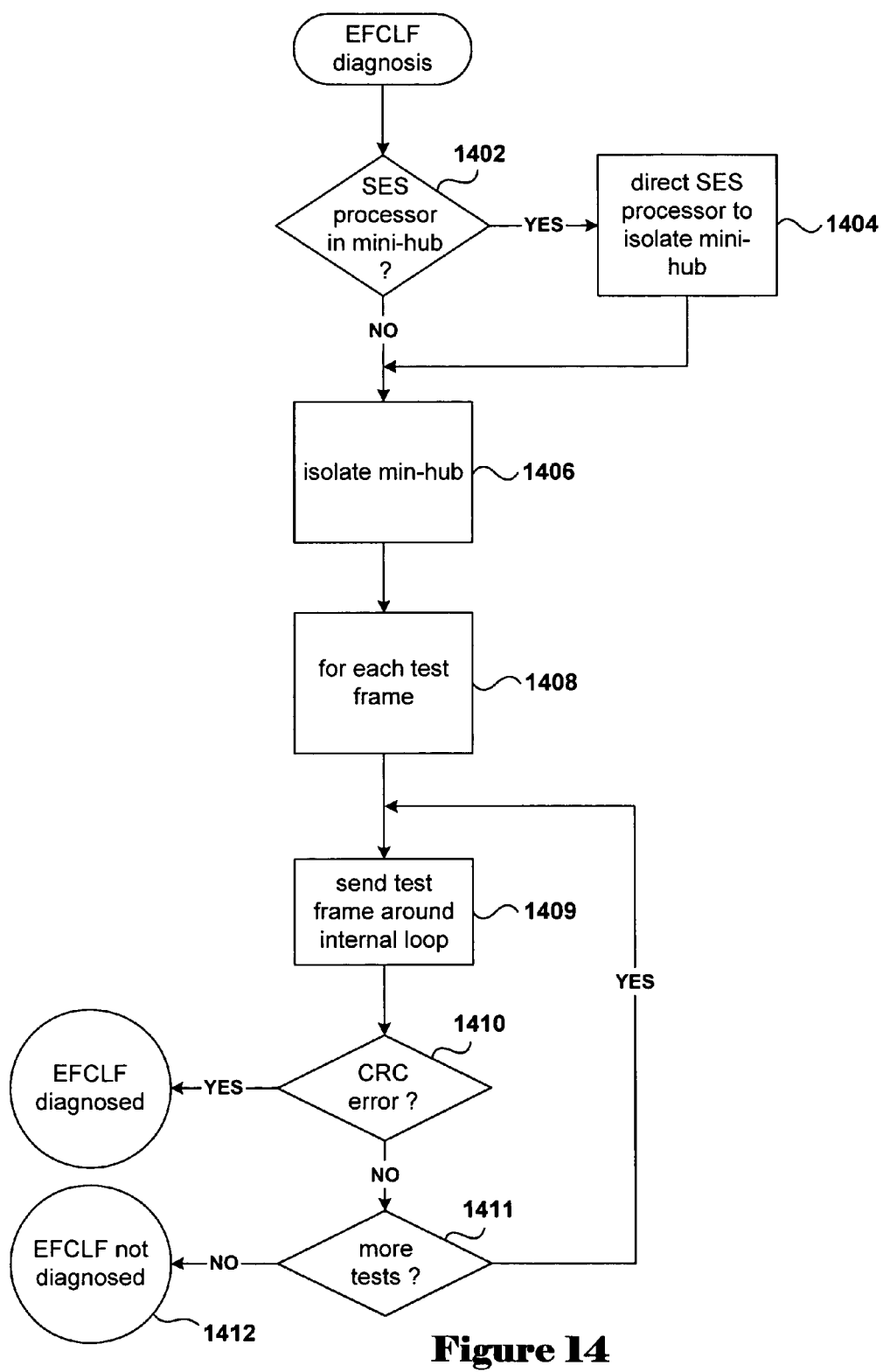
FIG. 14 is a control-flow diagram illustrating EFCLF diagnosis.

FIG. 14 is a control-flow diagram illustrating EFCLF diagnosis. Step 1402 determines whether or not an SR card includes an SES processor connected via the internal FC to an SR. If so, then the SR directs the SES processor to isolate the internal mini-hub from the external environment, via activation of port-bypass circuits, in step 1404. Otherwise, the SR itself isolates the internal mini-hub from the external environment, via activation of port-bypass circuits, in step 1406. Although not shown in FIG. 14, an inability to get the link to function may prevent the following diagnostics from being run. Isolation of the internal FC mini-hub allows the SR to send loop-back frames through the internal FC components within the SR card to test whether or not any of the internal components has failed. In the for-loop of steps 1408-1411, the SR sends the various different test frames around the internal loop, in step 1409, and determines whether or not CRC errors occur, in step 1410. If CRC errors do occur, as represented by state 1410, then an EFCLF error is diagnosed as having occurred. Otherwise, if all the test frames have successfully looped back, then an EFCLF error is not diagnosed, represented by state 1412 in FIG. 14.

Figure 15:
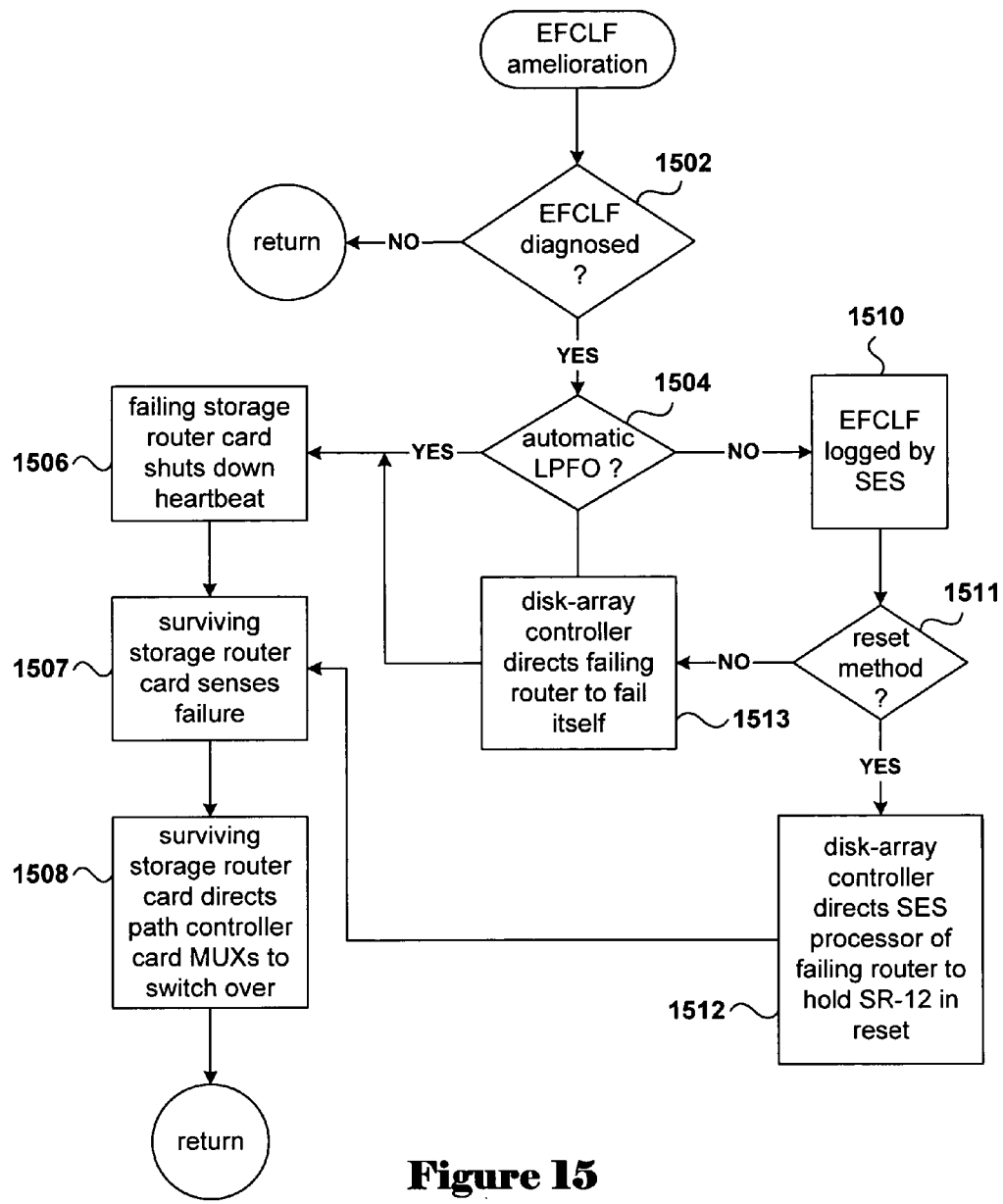
FIG. 15 is a control-flow diagram illustrating EFCLF handling.

FIG. 15 is a control-flow diagram illustrating EFCLF handling. In all the error recovery routines, a test is first made, in step 1502 of the EFCLF handling routine, to determine whether or not the error condition has been diagnosed. If not, then nothing remains to be done. Otherwise, in step 1504, a check is made as to whether the SR should automatically attempt to handle the EFCLF, or simply report the EFCLF for subsequent handling by a disk-array controller. This type of determination is observed throughout the various error-and/or-event handling routines that represent embodiments of the present invention. Parameters that control these decisions are generally configurable, so that storage shelves may be configured for error-and/or-event handling in a manner compatible with the disk array or other system in which they are included. In some cases, error-and/or-event handling, and even error-and/or-event diagnosis, may interfere with the timing and protocols employed within the systems. For example, the test frames used in the above loop-back-based diagnosis may be deemed too disruptive in certain systems, and therefore not configured. In those cases, it may be desirable for the storage shelf to simply report errors and events, and defer diagnosis and handling. In other cases, a system or disk-array-controller vendor may decide to allow the storage shelf to handle an error or event internally, to simplify system and disk-array-controller implementation. In FIG. 15, when automatic EFCLF handling is desired, as determined in step 1504, then, in step 1506, the SR that has detected an EFCLF carries out a controlled failure, shutting down the heartbeat mechanism used to ensure that inter-cooperating SR cards on different SR cards within a storage shelf are functional. In step 1507, the surviving SR card senses failure of the failing SR card and, in step 1508, directs the PC cards currently controlled by the failing SR card to switch their MUXs so that all PC cards are directly controlled by the surviving SR card, or, in other words, the surviving SR card carries out an LPFO. If automatic EFCLF handling is not desired, then, in step 1510, the SR directs the SES processor to log an EFCLF notification. When an external FC link is not operational, of course, then the SES may need to be accessed by a redundant FC link. As discussed in the parent application, there are normally two different FC loops interconnecting the SRs, SR cards, and external processing entities. When a reset method is employed, as determined in step 1511, then, in step 1512, the disk-array controller directs the SES processor of the failing SR card to hold the SR, or master SR in a multi-SR implementation, in reset, essentially discontinuing operation of the failing SR card. Control then flows to step 1507, with the surviving SR card of the storage shelf assuming control of all PC cards via an LPFO. If a reset method is not employed, then, in step 1513, the disk-array controller directs the master SR on the SR card that detected the EFCLF to fail itself, and control flows to step 1506.

Various different test frames may be employed by the SR during the loop back tests carried out by the SR for EFCLF diagnosis. Appendix A includes several of the test frames.

Figure 16:
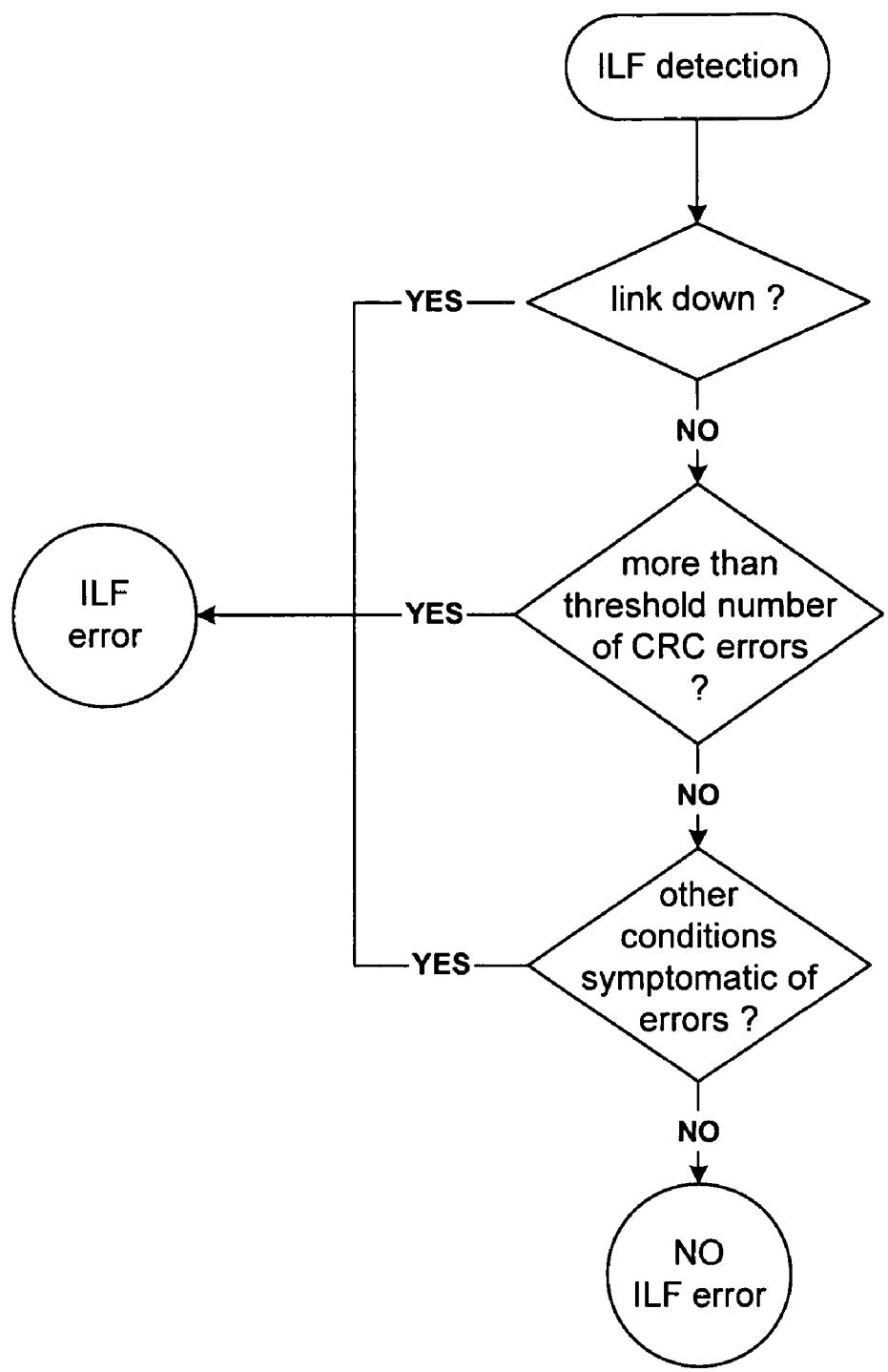
FIG. 16 is a control-flow diagram illustrating ILF detection.

FIG. 16 is a control-flow diagram illustrating ELF detection. Note that ILF detection is similar to ICPF detection, described with reference to FIG. 13. One difference is that link and CRC errors are detected on an FC port interconnected with the intra-card FC medium, rather than with an external FC medium. Note that, although referred to as the "external FC medium," the FC link is nonetheless partially contained within the backplane of the storage shelf.

Figure 17:
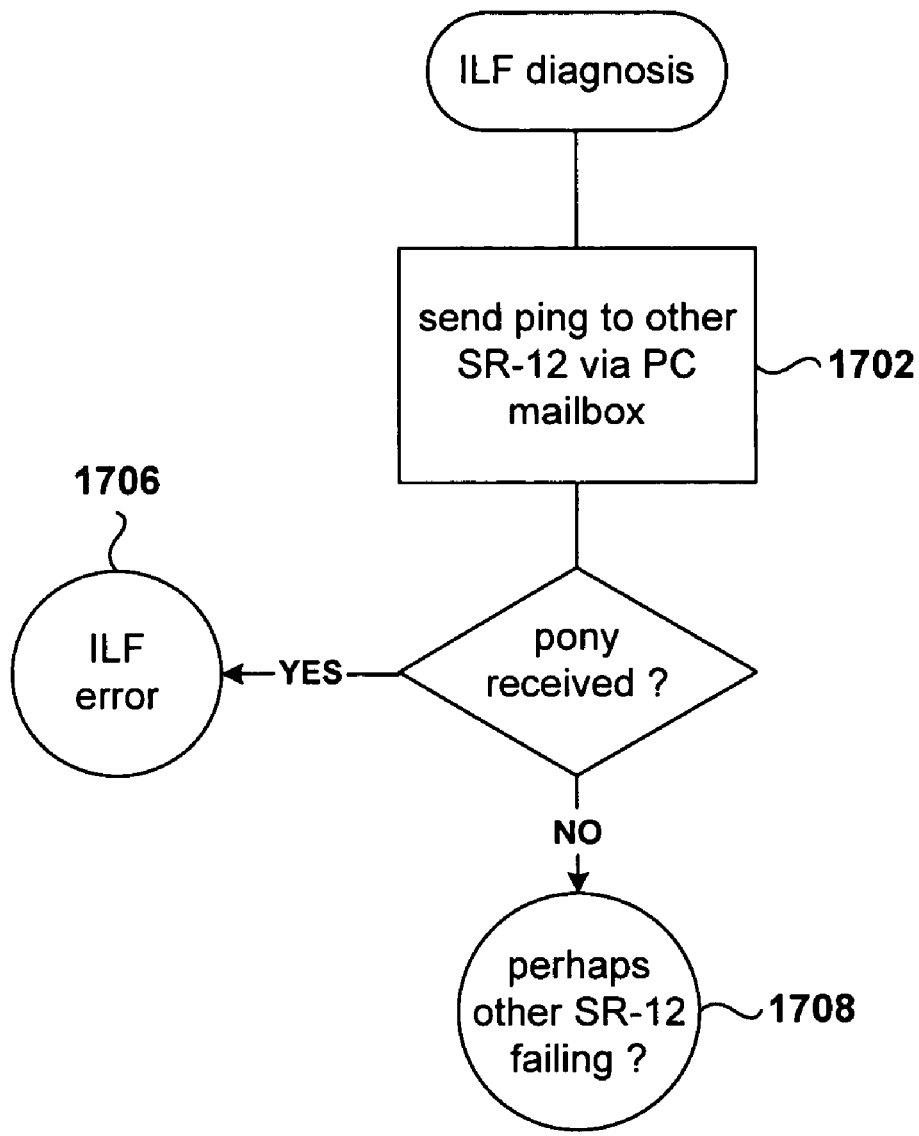
FIG. 17 is a control-flow diagram illustrating the ILF diagnosis.

FIG. 17 is a control-flow diagram illustrating ILF diagnosis. In step 1702, the master SR communicates with the master SR on the other SR card via the PC mailbox mechanism, described above. If the other SR is alive and well, as determined by a response from the other SR via the PC mailbox, then an ILF error is diagnosed, as represented by step 1706. Otherwise, a different type of error is probably occurring, such as a UCF error, as represented by step 1708.

Figure 18:
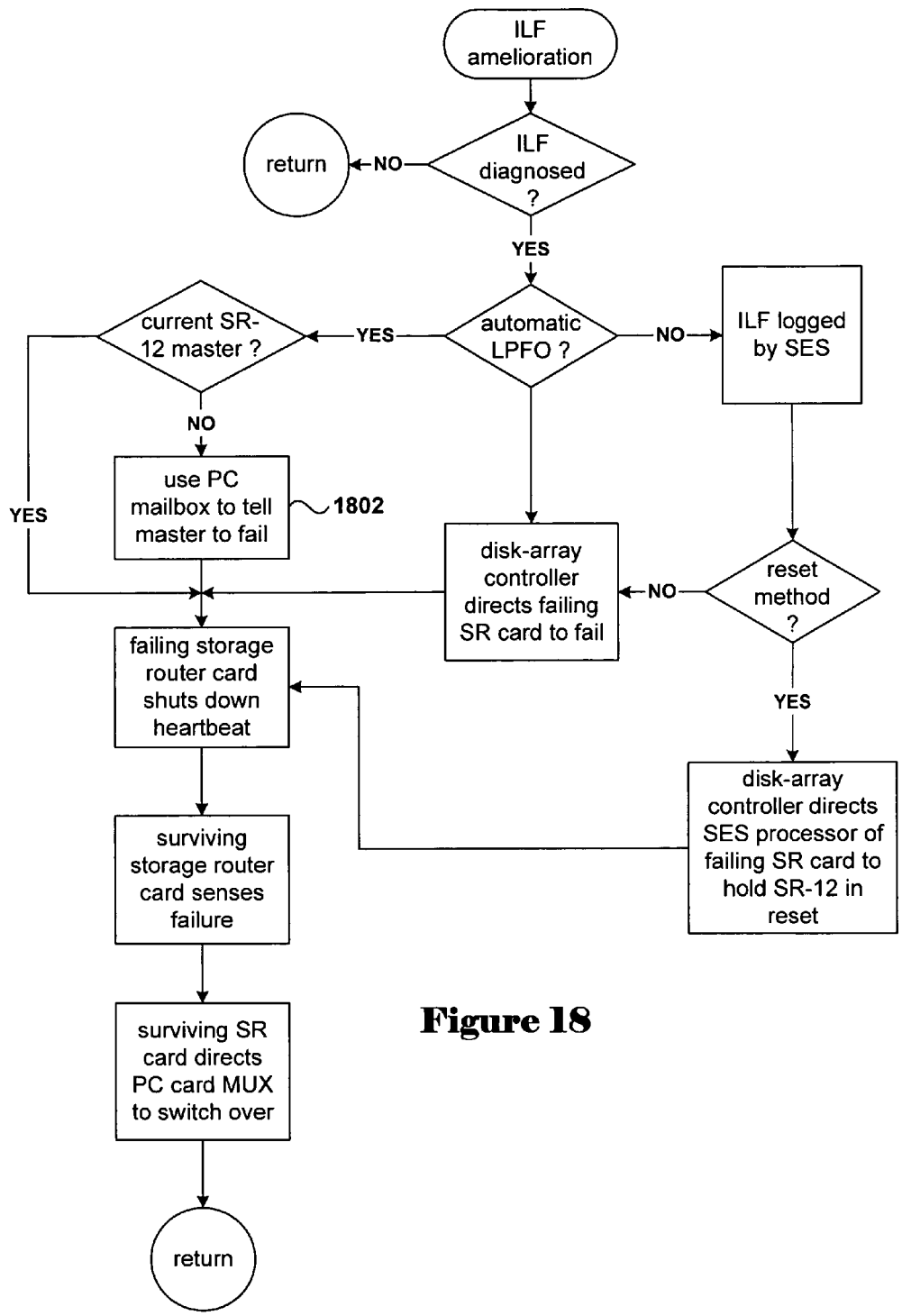
FIG. 18 is a control-flow diagram illustrating the ILF handling.

FIG. 18 is a control-flow diagram illustrating the ILF handling. ILF handling is similar to EFCLF amelioration, described above with respect to FIG. 15, except that, when automatic recovery is desired, a master SR of one SR card uses the PC mailbox mechanism, in step 1802, to tell the master SR of the other SR card to fail itself, since the internal FC link is unreliable or not operable.

Figure 19:
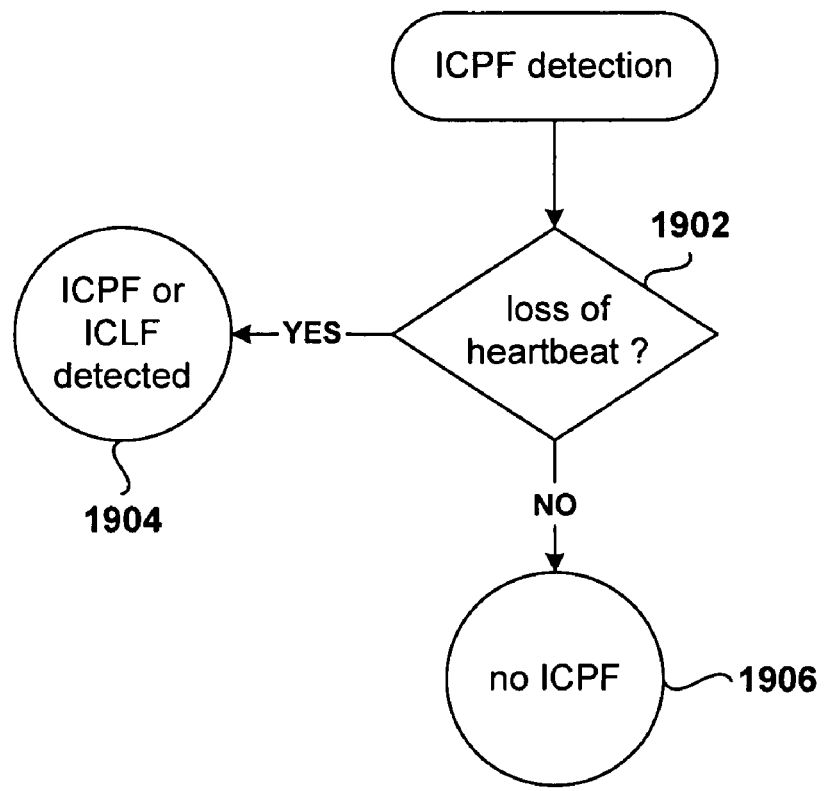
FIG. 19 is a control-flow diagram illustrating ICPF detection.

FIG. 19 is a control-flow diagram illustrating ICPF detection. An ICPF error is detected by loss of the heartbeat signal, in step 1902, by which each SR card in a storage shelf periodically ascertains the viability of the other SR card within the storage shelf. When loss of heartbeat is detected, an ICPF or ICLF error has probably occurred, represented by step 1904 in FIG. 19, although, in diagnosing the ICPF and ICLF, it may be determined that a CCF or UCF has instead occurred. Otherwise, no ICPF error is detected, represented by step 1906 in FIG. 19.

Figure 20:
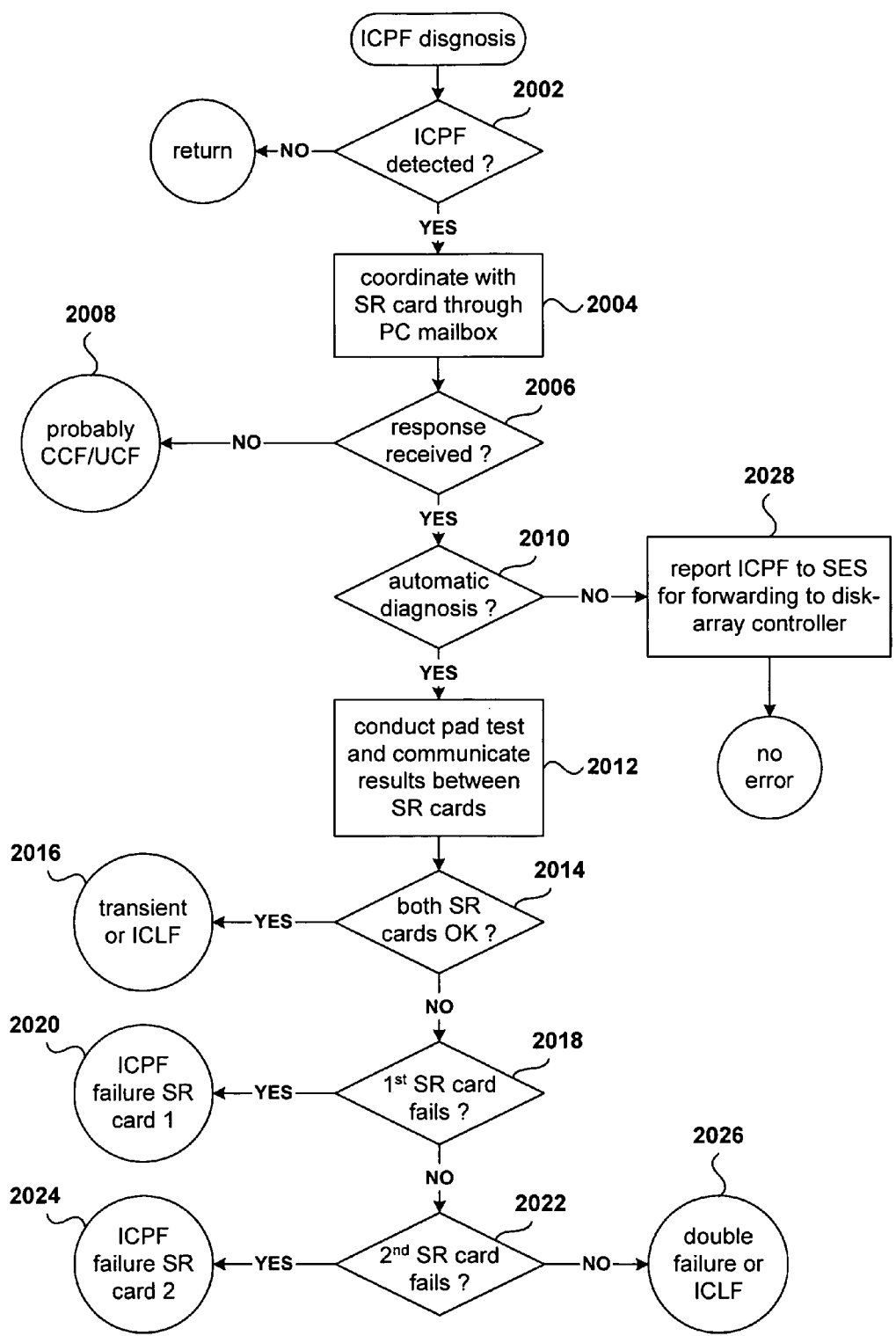
FIG. 20 is a control-flow diagram illustrating ICPF diagnosis.

FIG. 20 is a control-flow diagram illustrating ICPF diagnosis. If no ICPF error has been detected, as determined in step 2002, then no diagnosis need be made. Otherwise, in step 2004, the master SR of one SR card coordinates with a master SR of the other SR card within a storage shelf through the PC mailbox mechanism to ascertain whether the other SR card is alive and functioning. If no response is obtained, as determined in step 2006, then the other SR card within the storage shelf has probably failed, and a CCF or UCF error has probably occurred, as represented by state 2008 in FIG. 20. Otherwise, if automatic diagnosis has been configured, as determined in step 2010, then, in step 2012, SRs of both SR cards carry out pad tests to ascertain whether the inter-card FC ports have failed. If both SR cards turn out to have functional inter-card FC ports, as determined in step 2014, then a transient failure or an ICLF condition has occurred, as represented by state 2016 in FIG. 20. If, instead, the first SR card in the storage shelf has experienced an FC port failure, as determined in step 2016, then an ICPF failure on the first SR card has occurred, as represented by state 2020 in FIG. 20. If, instead, an FC port failure has occurred on the second SR card in the storage shelf, as determined in step 2022, then an ICPF failure on the second SR card has occurred, as represented by state 2024 in FIG. 20. Otherwise, either both SR cards have failed, a relatively remote possibility, or an ICLF error has occurred, as represented by state 2026 in FIG. 20. If automatic diagnosis is not configured, then, in step 2028, an SR reports an ICPF failure to the SES processor for forwarding to the disk-array controller, which then undertakes to recover from the diagnosed ICPF.

Figure 21:
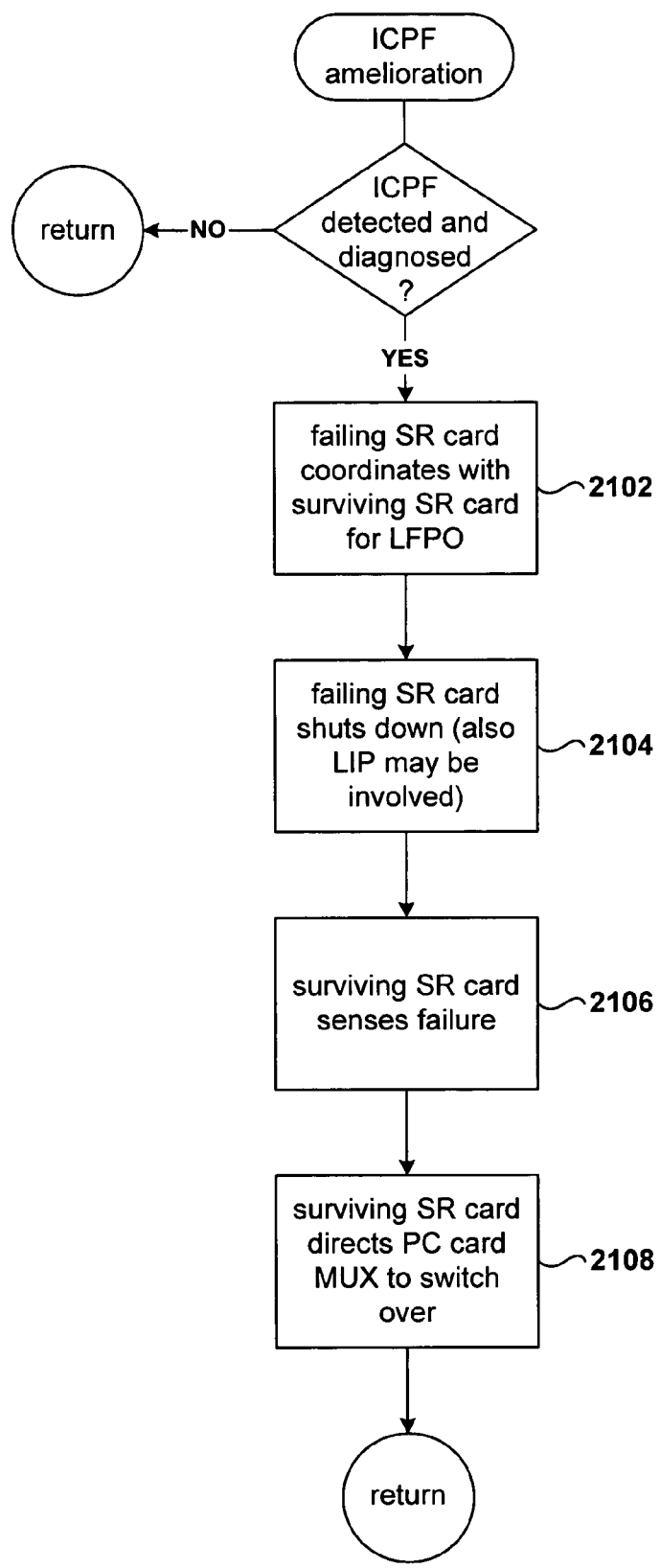
FIG. 21 is a control-flow diagram illustrating ICPF handling.

FIG. 21 is a control-flow diagram illustrating ICPF handling. In step 2102, the SR card experiencing an FC port failure coordinates with the surviving SR card within the storage shelf to undertake an LPFO. The failing SR card carries out a controlled shutdown, which may invoke the loop initialization protocol ("LIP") on the fiber channel, in turn resulting in relinquishing of the AL_PA addresses assigned to SATA drives of the failing SR card, in step 2104. In step 2106, the surviving SR card senses the shut down of the failing SR card and, in step 2108, directs the PC card MUXs of the PC cards previously controlled by the failing SR card to switch over to the surviving SR card.

Figure 22:
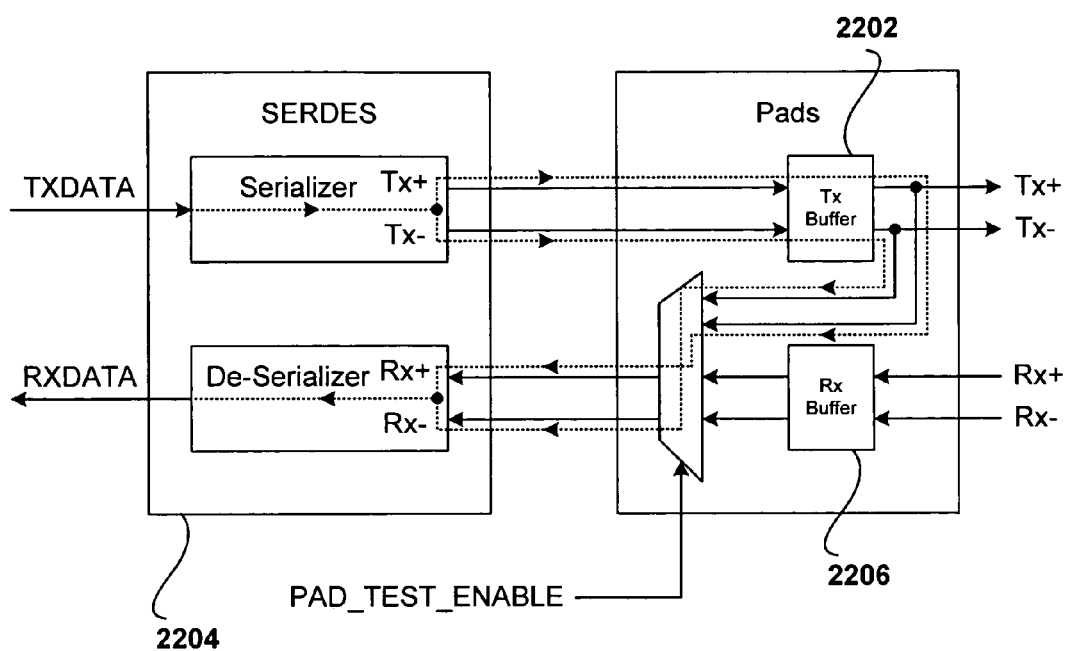
FIG. 22 illustrates the pad test undertaken by a storage-shelf router in order to test an FC port.

FIG. 22 illustrates the pad test undertaken by a storage-shelf router in order to test an FC port. FC frames can be routed from the outgoing TX buffer 2202 back to the FC port serializer/de-serializer 2204, essentially causing a loop back through the bulk of components of the FC port. If the loop back succeeds, then an error is most likely occurring external to the FC port. Note that the RX buffer 2206, through which frames are received from the FC, is not tested by the pad test.

Figure 23A:
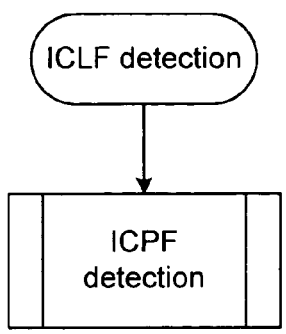
FIGS. 23A and 23B provide control-flow diagrams illustrating ICLF detection and ICLF diagnosis.
Figure 23B:
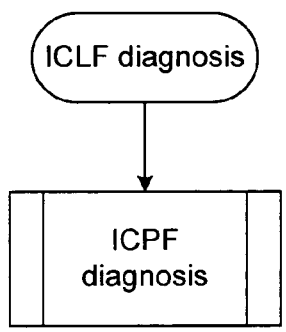

FIGS. 23A and 23B provide control-flow diagrams illustrating ICLF detection and ICLF diagnosis. As can be seen in FIGS. 23A-B, the ICLF detection and diagnosis routines are similar to the previously described ICPF detection and ICPF diagnosis routines.

Figure 24:
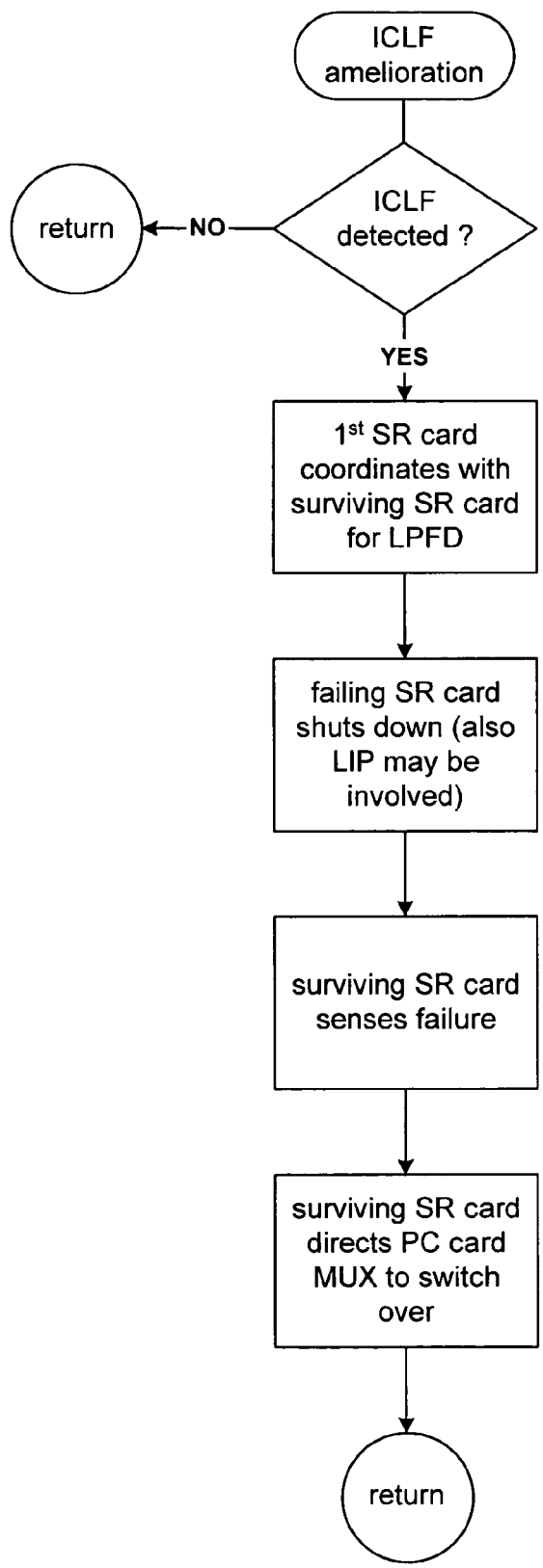
FIG. 24 is a control-flow diagram illustrating ICLF handling.

FIG. 24 is a control-flow diagram illustrating ICLF handling. The ICLF handling routine is similar to the ICPF error-handling routine, described above with reference to FIG. 21, and is therefore not further described.

Figure 25:
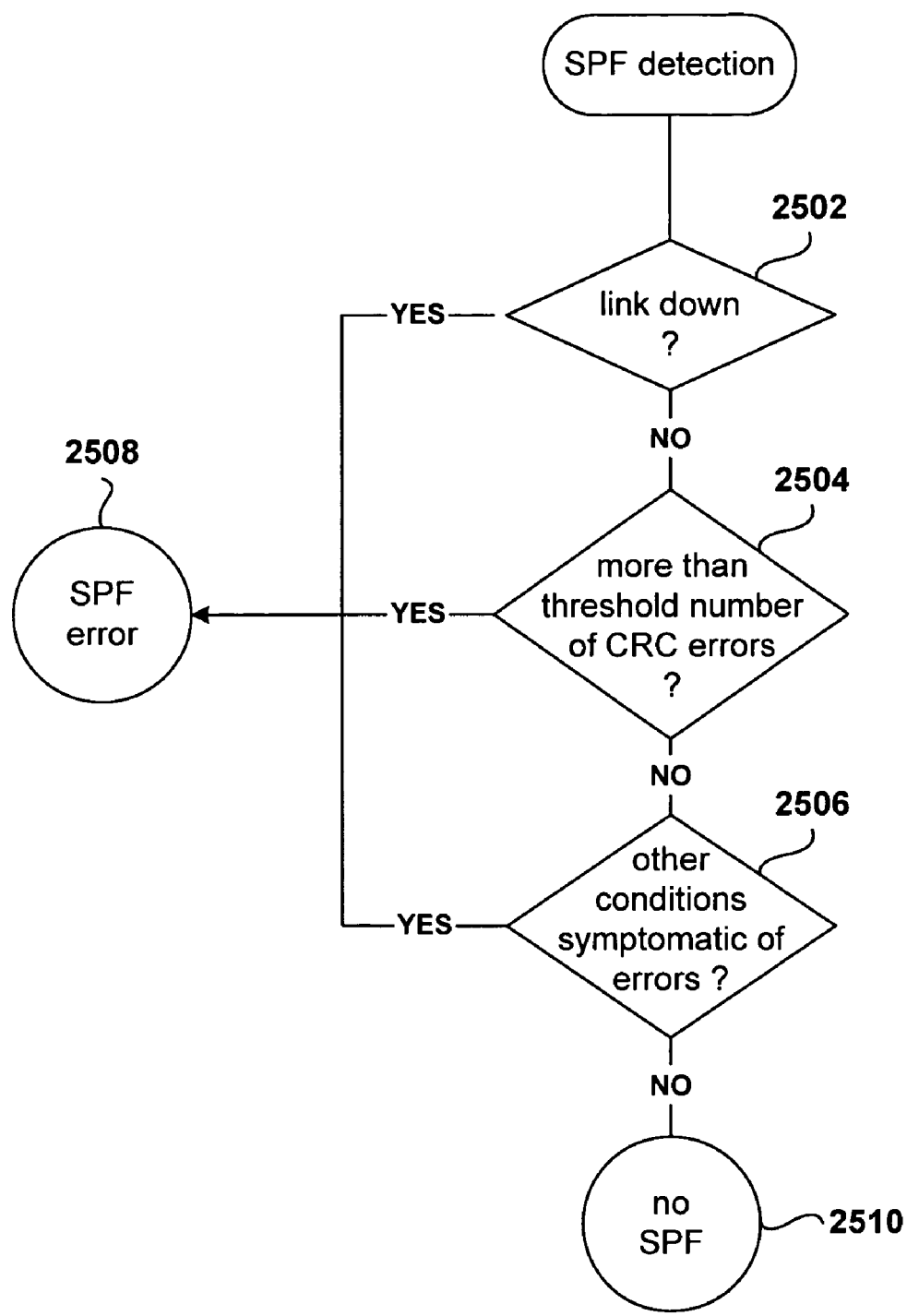
FIG. 25 is a control-flow diagram illustrating SPF detection.

FIG. 25 is a control-flow diagram illustrating SPF detection. An SPF is detected by an SR either through a link-down event, in step 2502, a number of CRC errors over the link in excess of some threshold number of CRC errors within a recent period of time, in step 2504, or other similar types of conditions indicative of a SATA link error, as represented by step 2506 in FIG. 25. If any of the SPF error indications are indicated, then an SPF error is considered to have been detected, as represented by state 2508 in FIG. 25. Otherwise, no SPF error is detected, as represented by state 2510 in FIG. 25.

Figure 26:
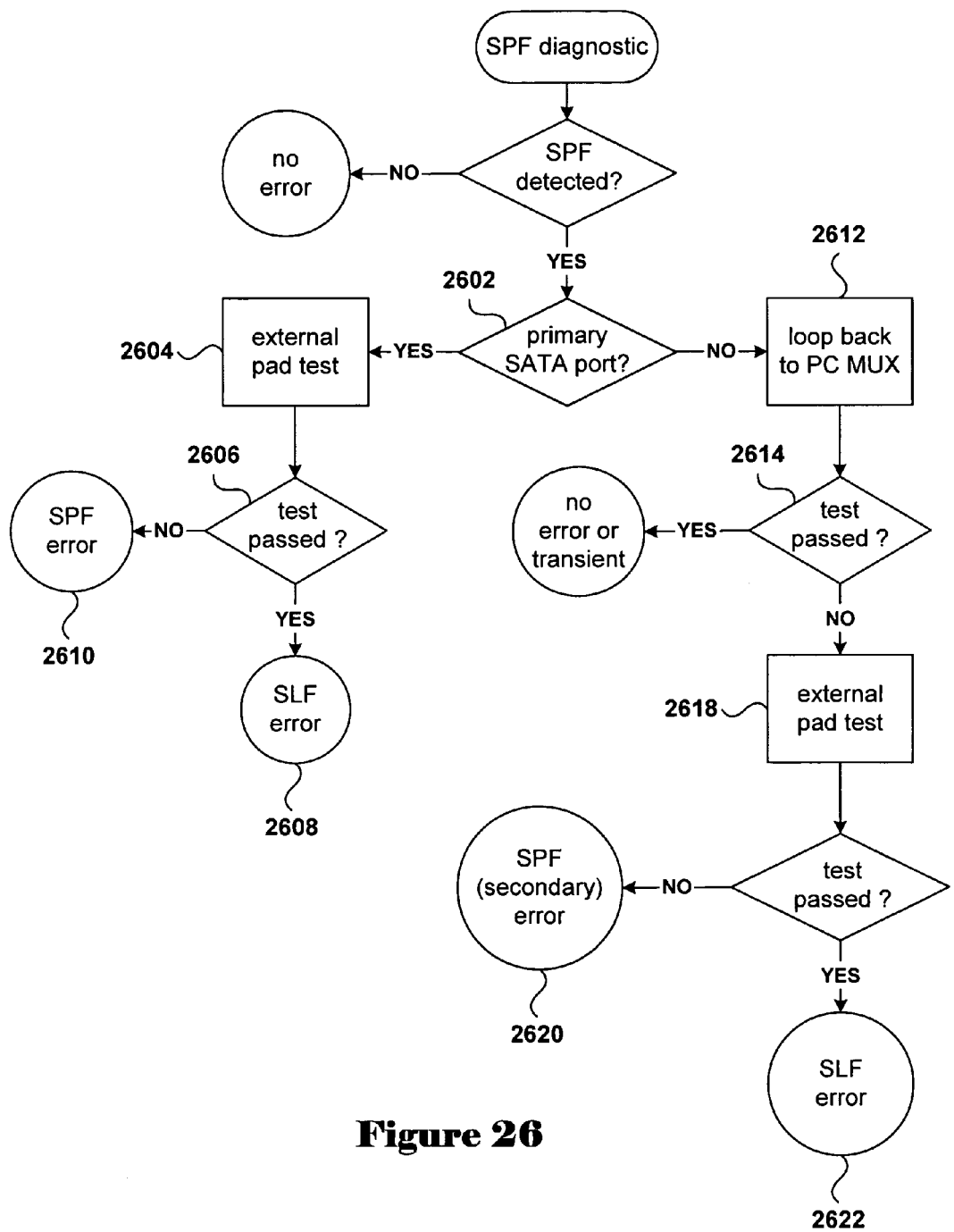
FIG. 26 is a control-flow diagram illustrating SPF diagnosis.

FIG. 26 is a control-flow diagram illustrating SPF diagnosis. When the primary SATA port may have failed, as determined in step 2602, then the SR conducts an external pad test on the SATA port, in step 2604. If the test succeeds, as determined in step 2606, then an SLF error is indicated, as represented by state 2608 in FIG. 26. Otherwise, an SPF error is indicated, as represented by state 2610 in FIG. 26. If, instead, a secondary SATA port is exhibiting potential failure, then, in step 2612, the SR notes whether a continuously executed, background loop-back test to the 2:1 MUX of the PC card interconnected with the SR through the secondary SATA port has recently succeeded. If the loopback test has succeeded, as determined in step 2614, then either a transient error condition occurred, or no error has occurred, as represented by state 2616 in FIG. 26. Otherwise, an external pad test is carried out in step 2618 and indication of an SPF 2620 or an SLF 2622 is provided, depending on whether or not the external pad test succeeds. Loop-back test patterns used are included in Appendix B.

Figure 27:
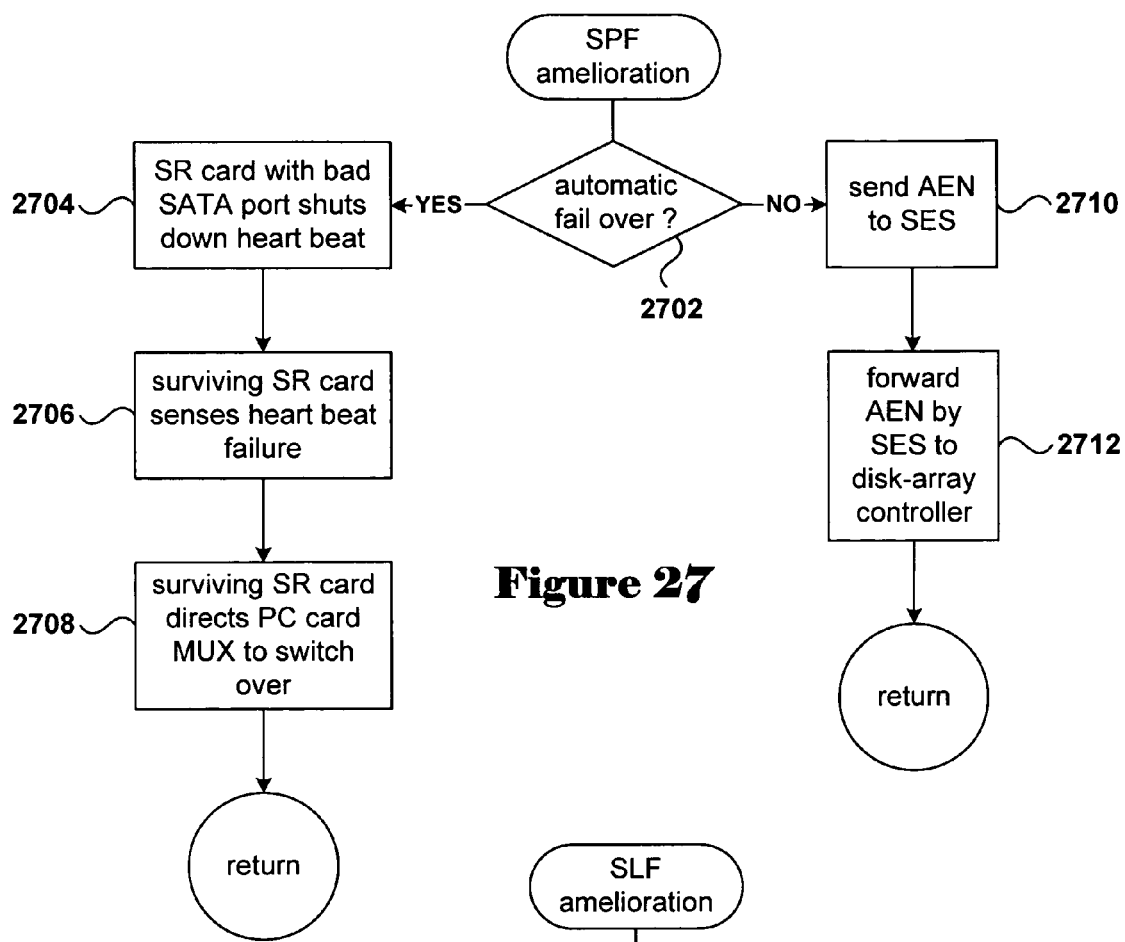
FIG. 27 is a control-flow diagram illustrating SPF handling.

FIG. 27 is a control-flow diagram illustrating SPF handling. When automatic error recovery has been configured, as determined in step 2702, then the SR card with a bad SATA port carries out a controlled shutdown, in step 2704, and the surviving SR card within the storage shelf senses heartbeat failure, in step 2706, and carries out an LPFO in step 2708. Otherwise, the SR sends an asynchronous event notification ("AEN") to the SES processor on the SR card, in step 2710, which is then forwarded by the SES processor to the disk-array controller in step 2712. The disk-array controller may carry out any of a number of different recovery schemes, including shutting down the SR card with the failed SATA port.

Figure 28:
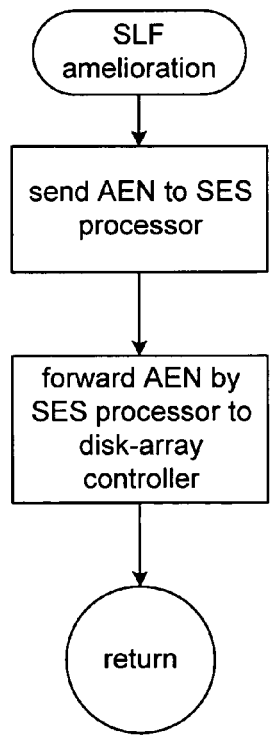
FIG. 28 is a control-flow diagram illustrating SLF handling.

FIG. 28 is a control-flow diagram illustrating SLF handling. An SLF is diagnosed during SPF diagnosis, described above with reference to FIG. 26. In the case of an SLF, an AEN is sent to the SES processor, for forwarding to the disk-array controller, which then undertakes recovery operations.

Figure 29:
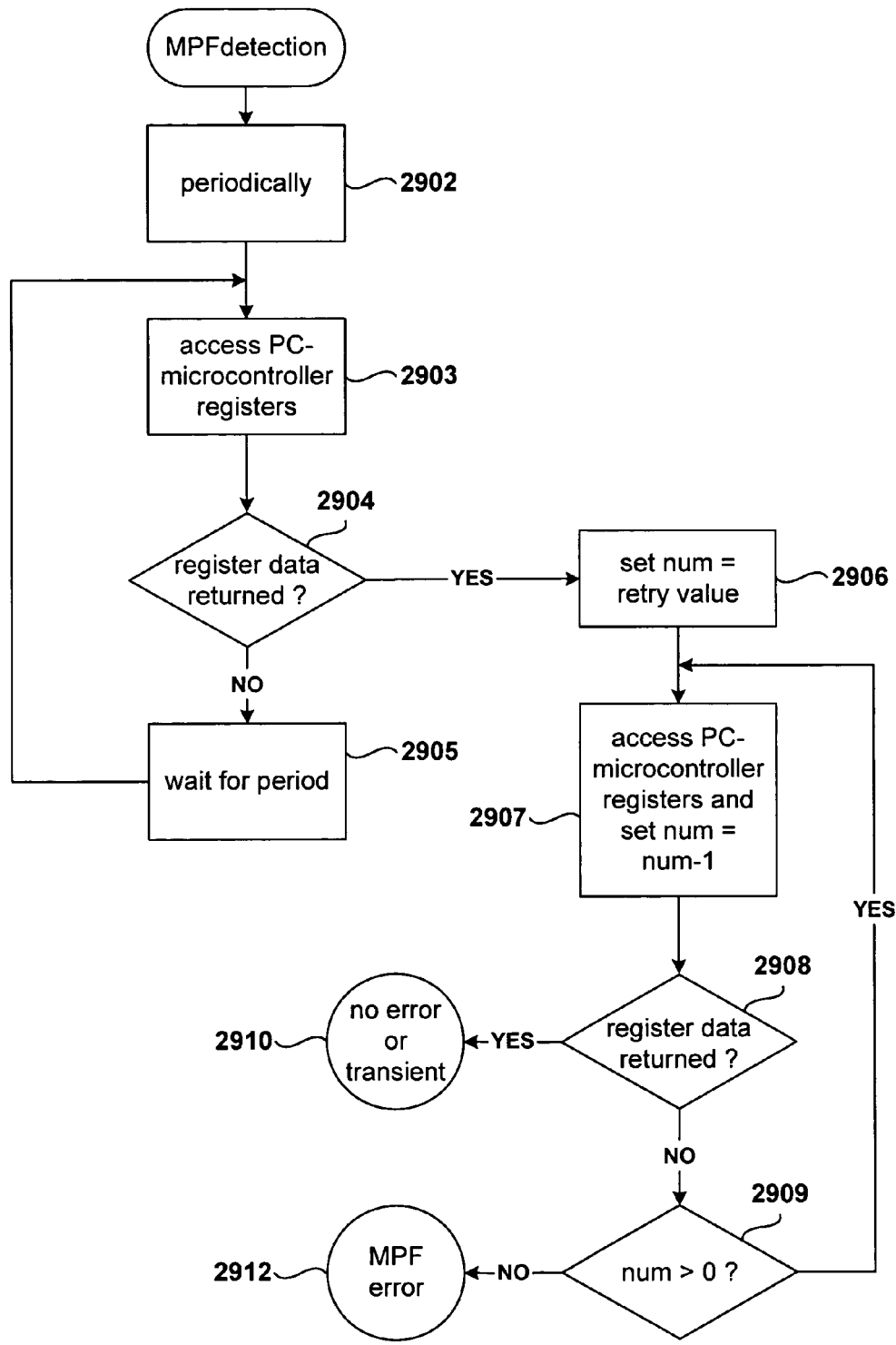
FIG. 29 is a control-flow diagram illustrating MPF detection.

FIG. 29 is a control-flow diagram illustrating MPF detection. In the for-loop of steps 2902-2905, an SR periodically accesses registers on each PC microcontroller to determine whether or not the management link between the SR and the PC card is functional. If access to the PC microcontroller registers fails, then in the counted loop of steps 2906-2909, the SR tries for some set number of times to access the PC microcontroller registers through the management link. If the registers are successfully accessed, then no error or a transient error condition has occurred, as represented by state 2910 in FIG. 29. Otherwise, if the registers cannot be accessed, then an MPF has occurred, as represented by state 2912 in FIG. 29.

Figures 30, 31:
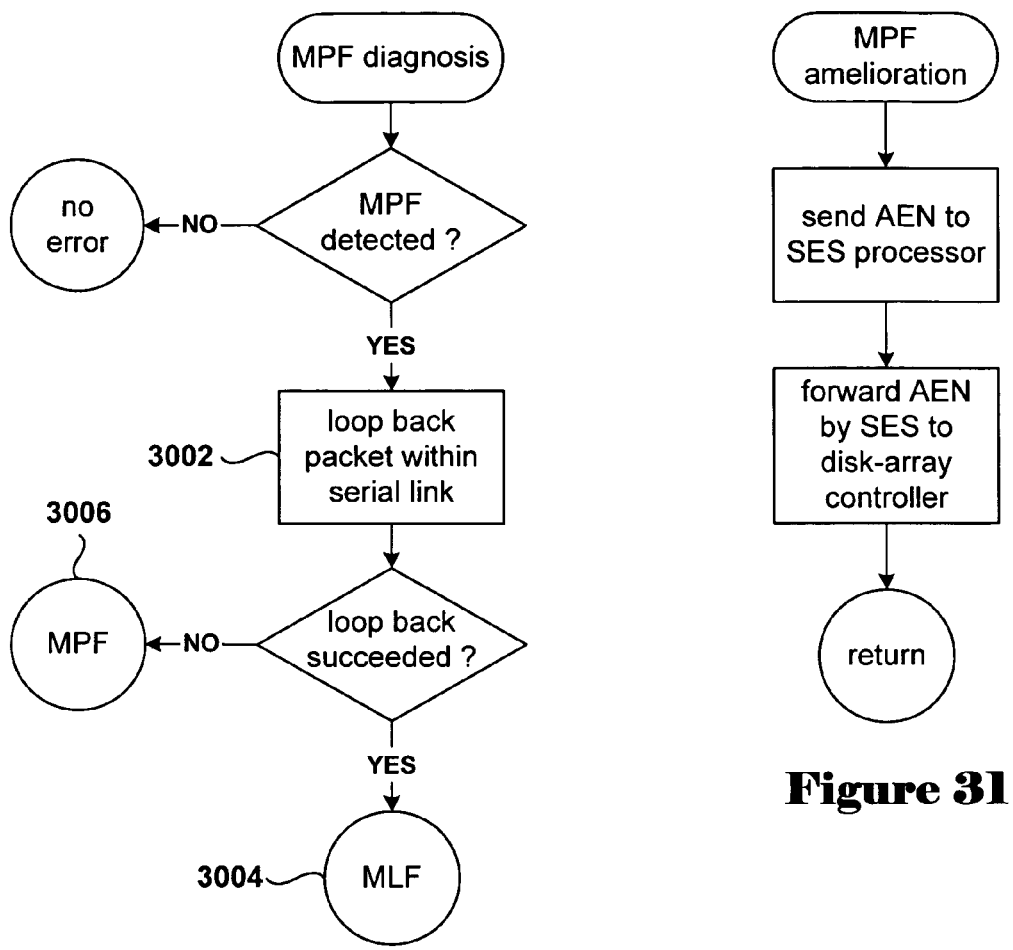
FIG. 30 is a control-flow diagram illustrating MPF diagnosis.
FIG. 31 is a control-flow diagram illustrating MPF handling.

FIG. 30 is a control-flow diagram illustrating MPF diagnosis. The MPF diagnosis routine attempts loop back within the SR, in step 3002. If loop back succeeds, then an MLF error is suggested, as represented by state 3004 in FIG. 30. Otherwise, an MPF error is suggested, as represented by state 3006 in FIG. 30.

FIG. 31 is a control-flow diagram illustrating MPF handling. MPF handling simply involves reporting the management port failure to the SES processor, which forwards an AEN to the disk-array controller. The disk-array controller then undertakes any corrective action.

Figure 32:
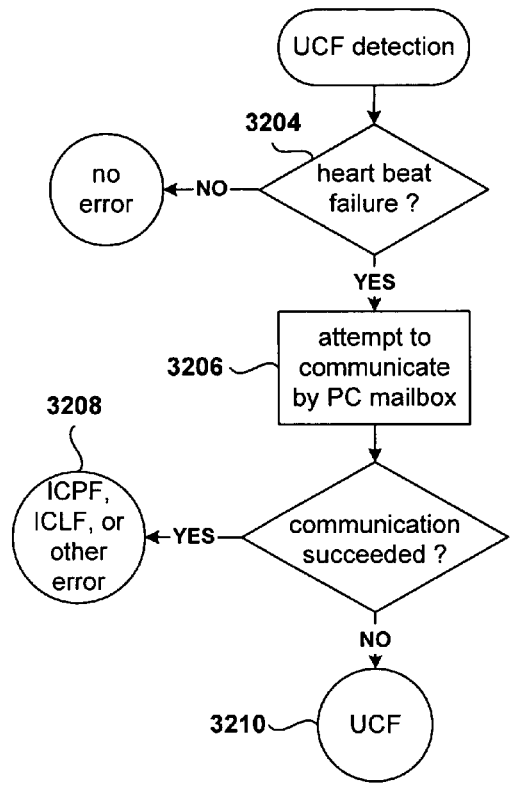
FIG. 32 is a control-flow diagram illustrating UCF detection.

FIG. 32 is a control-flow diagram illustrating UCF detection. A UCF error is first indicated by a heartbeat failure, as detected in step 3204. Upon detecting a heartbeat failure, the master SR on one SR card attempts to communicate, through the PC mailbox mechanism, with the master SR on the other SR card of a storage shelf, in step 3206. If communication succeeds, then the other SR card is functional, and an ICPF, ICLF, or other such errors indicated, as represented in step 3208 in FIG. 32. Otherwise, a UCF error is indicated, represented by state 3210 in FIG. 32.

Figure 33A:
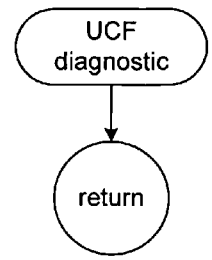
FIGS. 33A-B provide control-flow diagrams illustrating UCF diagnostic and the UCF handling.
Figure 33B:
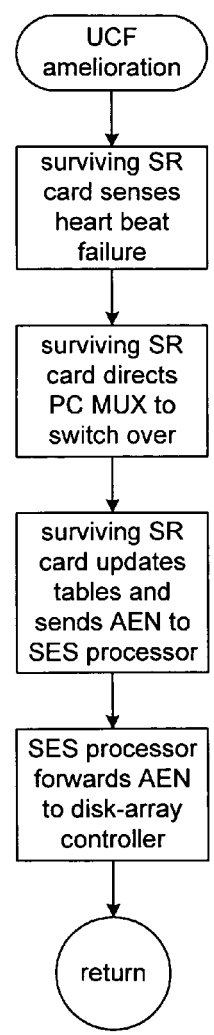

FIGS. 33A-B provide control-flow diagrams illustrating UCF diagnostic and the UCF handling. As shown in FIG. 33A, no additional diagnostics are undertaken for a UCF-detected error. As shown in FIG. 33B, UCF handling essentially involves a LPFO by the surviving SR card in the storage shelf and reporting an AEN to the disk-array controller via the SES processor.

Figure 34:
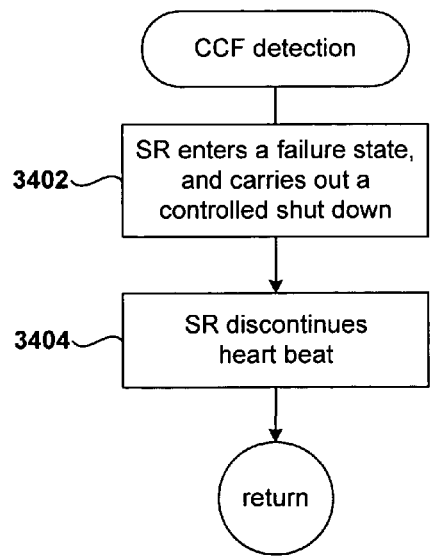
FIG. 34 is a control-flow diagram illustrating CCF detection.

FIG. 34 is a control-flow diagram illustrating CCF detection. The CCF error is detected when an SR enters a failure state, such as a panic, assert, or other trap in the firmware of the SR, and carries out a controlled shutdown, in step 3402 of FIG. 34. The SR, in the process of the controlled shutdown, discontinues the heartbeat in step 3404, in turn detected by the other SR card.

Figure 35A:
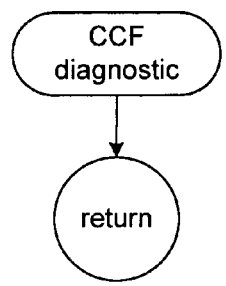
FIGS. 35A-B provide control-flow diagrams illustrating CCF diagnosis and CCF handling.
Figure 35B:
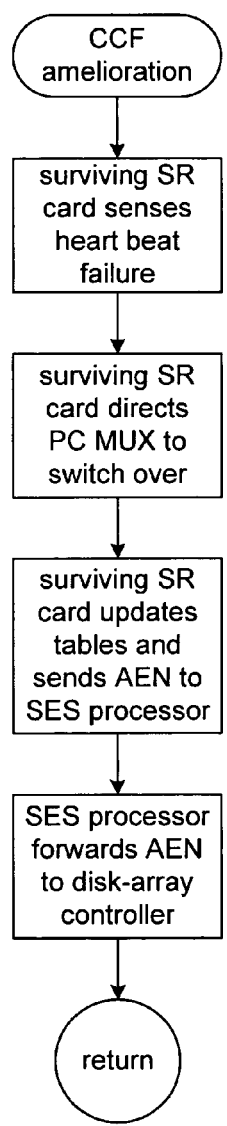

FIGS. 35A-B provide control-flow diagrams illustrating CCF diagnosis and CCF handling. Both the CCF diagnostic and CCF handling routines are equivalent to those discussed above with reference to FIGS. 33A-B for the UCF error.

Figure 36:
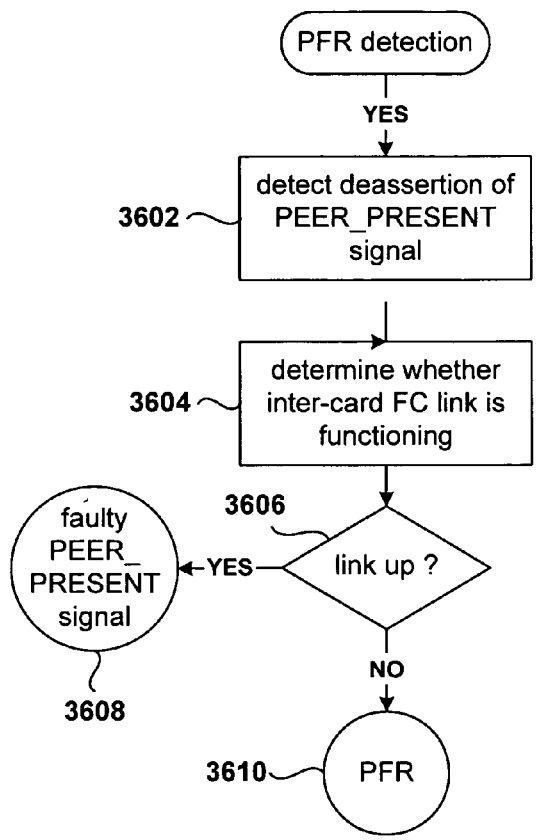
FIG. 36 is a control-flow diagram illustrating PFR detection.

FIG. 36 is a control-flow diagram illustrating PFR detection. In step 3602, an SR card within the storage shelf detects de-assertion of the PEER_PRESENT signal. Then, in step 3604, an SR within the correctly functioning SR card determines whether or not the inter-card FC link is properly functioning by communicating with the other SR card of the storage shelf. If the link is up, as determined in step 3606, a faulty PEER_PRESENT signal is indicated, represented in FIG. 36 by state 3608, and reported to the SES. Otherwise, a PFR is indicated, represented by state 3610 in FIG. 36. The PFR event has no additional diagnostics, and is recovered by an LPFO carried out by the SR card surviving in the storage shelf.

Figure 37:
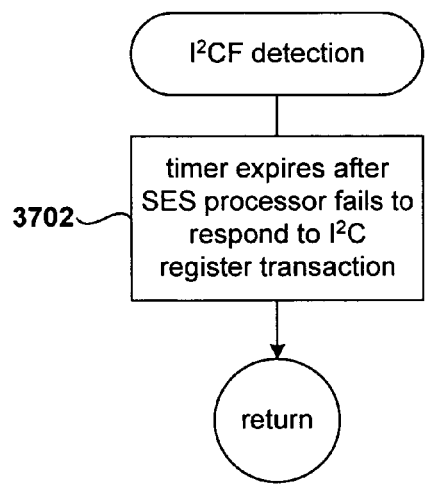
FIG. 37 is a control-flow diagram illustrating $I^2CF$ detection.

FIG. 37 is a control-flow diagram illustrating $I^2CF$ detection. As shown in FIG. 37, when a timer expires within an SR after an attempt to access $I^2C$ registers on the SES processor, in step 3702, then a potential $I^2CF$ error is detected. In general, the SR will have generated an interrupt to the SES process using a side-band signal, and when this interrupt is not acknowledged prior to a timeout, then the error condition obtains. As with the PFR error, no additional diagnostics are employed, and the correctly functioning SF card within the storage shelf carries out an LPFO to assume responsibility for all PC cards and SATA disks of the storage shelf. The LPFO is a configurable option.

Figure 38:
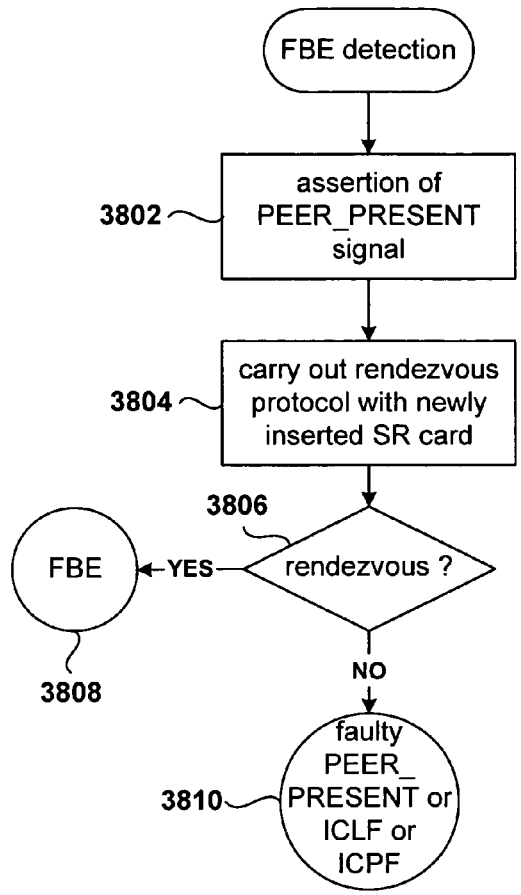
FIG. 38 is a control-flow diagram illustrating FBE detection.

FIG. 38 is a control-flow diagram illustrating FBE detection. The FBE event is detected by an SR when a PEER_PRESENT signal is asserted, in step 3802, following a de-assertion of the PEER_PRESENT signal. Upon detection of the PEER_PRESENT signal, the SR carries out a rendezvous protocol with the newly inserted SR card, in step 3804. If the rendezvous succeeds, as determined in step 3806, then FBE event is detected, represented in FIG. 38 by state 3808. Otherwise, a faulty PEER_PRESENT signal or an ICLF or ICPF error has probably occurred, represented by state 3810 in FIG. 38.

Figure 39A:
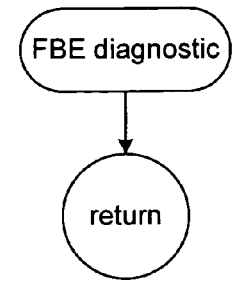
FIGS. 39A-B provide control-flow diagrams illustrating FBE diagnosis and FBE handling.
Figure 39B:
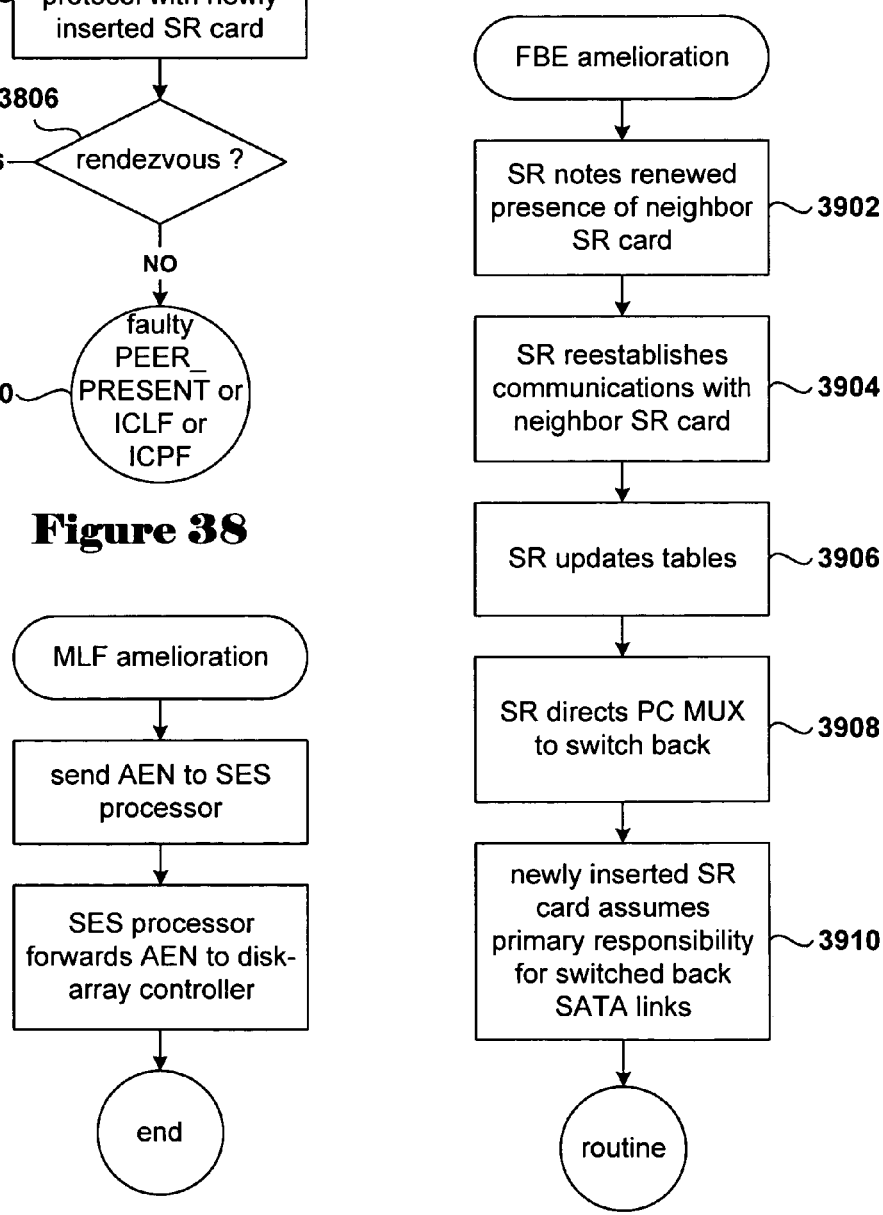

FIGS. 39A-B provide control-flow diagrams illustrating FBE diagnosis and FBE handling. As shown in FIG. 39A, there is no further diagnosis needed for an FBE event. FBE handling occurs when the SR notes renewed presence of a neighboring SR card within the storage shelf, in step 3902. The SR re-establishes communication with the newly inserted SR card in step 3904. The SR then updates in memory routing tables and various data structures in step 3906 and carries out an LPFB operation in step 3908. The newly inserted SR card then assumes responsibility for a portion of the SATA disk drives in the storage shelf, in step 3910.

Figure 40:
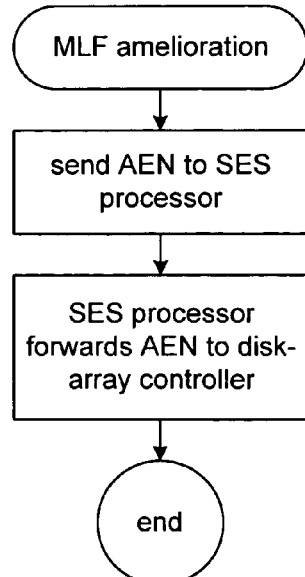
FIG. 40 is a control-flow diagram illustrating MLF handling.

FIG. 40 is a control-flow diagram illustrating MLF handling. MLF handling consists of reporting an AEN through the SES processor to the disk-array controller. The disk-array controller then undertakes any corrective action deemed necessary, including replacing the drive or ultimately replacing the backplane.

FIGS. 41A-C provide control-flow diagrams illustrating SDF detection, diagnosis, and handling. An SDF error is detected by failure of an SATA disk initialization, failure of a read operation directed to the SATA disk, and other such errors, in step 4102. No further diagnosis is needed, as indicated in FIG. 41B, an SDF handling consists simply of reporting the SDF error through the SES processor to the disk-array controller.

FIGS. 42A-C provide control-flow diagrams illustrating FRE detection, diagnosis, and handling. FRE event is detected by de-assertion of the FRU_PRESENT signal, in step 4202. No further diagnosis is necessary, and the FRE event is handled by generating an LIP, resulting in relinquishing the AL_PA for the removed disk drive, when LIP-based handling is configured. The FRE is then reported via the SES processor to the disk-array controller.

Figure 43A:
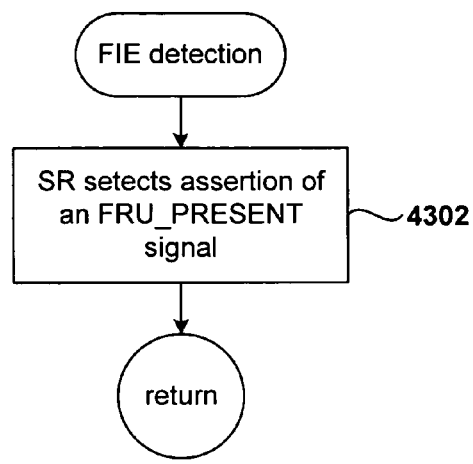
FIGS. 43A-C provide control-flow diagrams illustrating FIE detection, diagnosis, and handling.
Figure 43B:
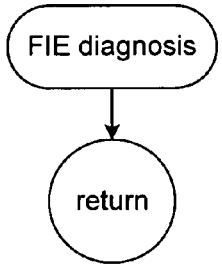
Figure 43C:
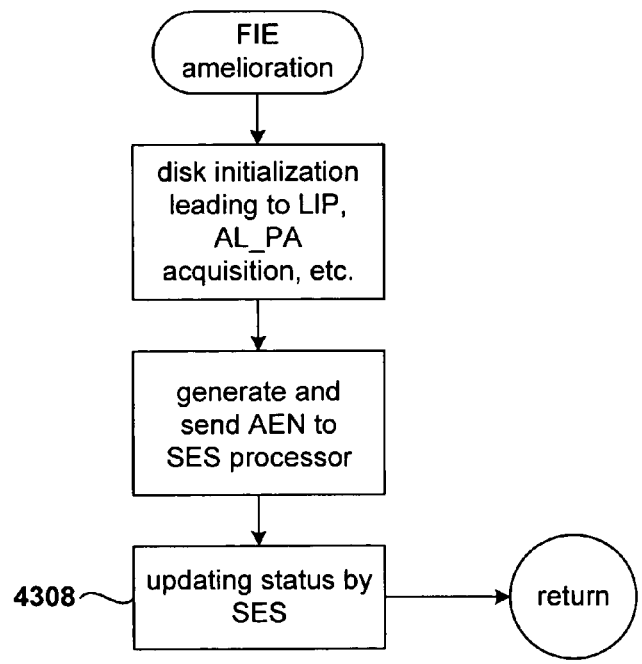

FIGS. 43A-C provide control-flow diagrams illustrating FE detection, diagnosis, and handling. An SR detects FIE via the assertion of an FRU_PRESENT signal, step 4302. No further diagnosis is needed, and the FIE event is handled by initializing the newly inserted disk, leading to a LIP and to AL_PA acquisition. An AEN is sent via the SES processor to the disk-array controller, and various status information is updated in step 4308.

It should be noted that the various data structures and tables maintained in the memory of the SR cards, discussed in the parent application, are constantly updated to reflect the current state of the storage shelf and storage shelf components. For example, the data structures are updated upon a LPFO, SPFO, LPFB, and other such events.

Figure 44A:
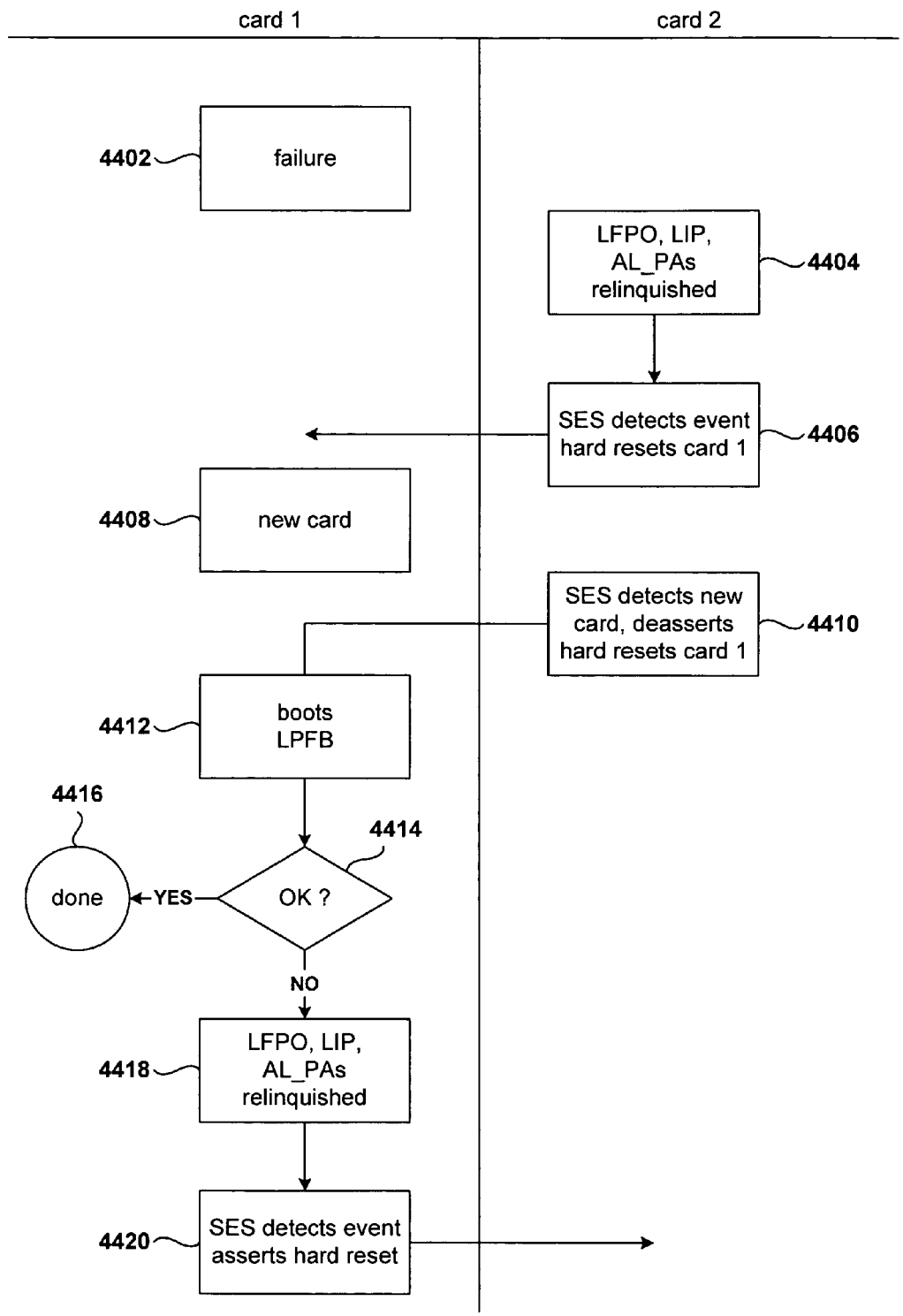
FIGS. 44A-B provide control-flow diagrams illustrating one router card replacement procedure.
Figure 44B:
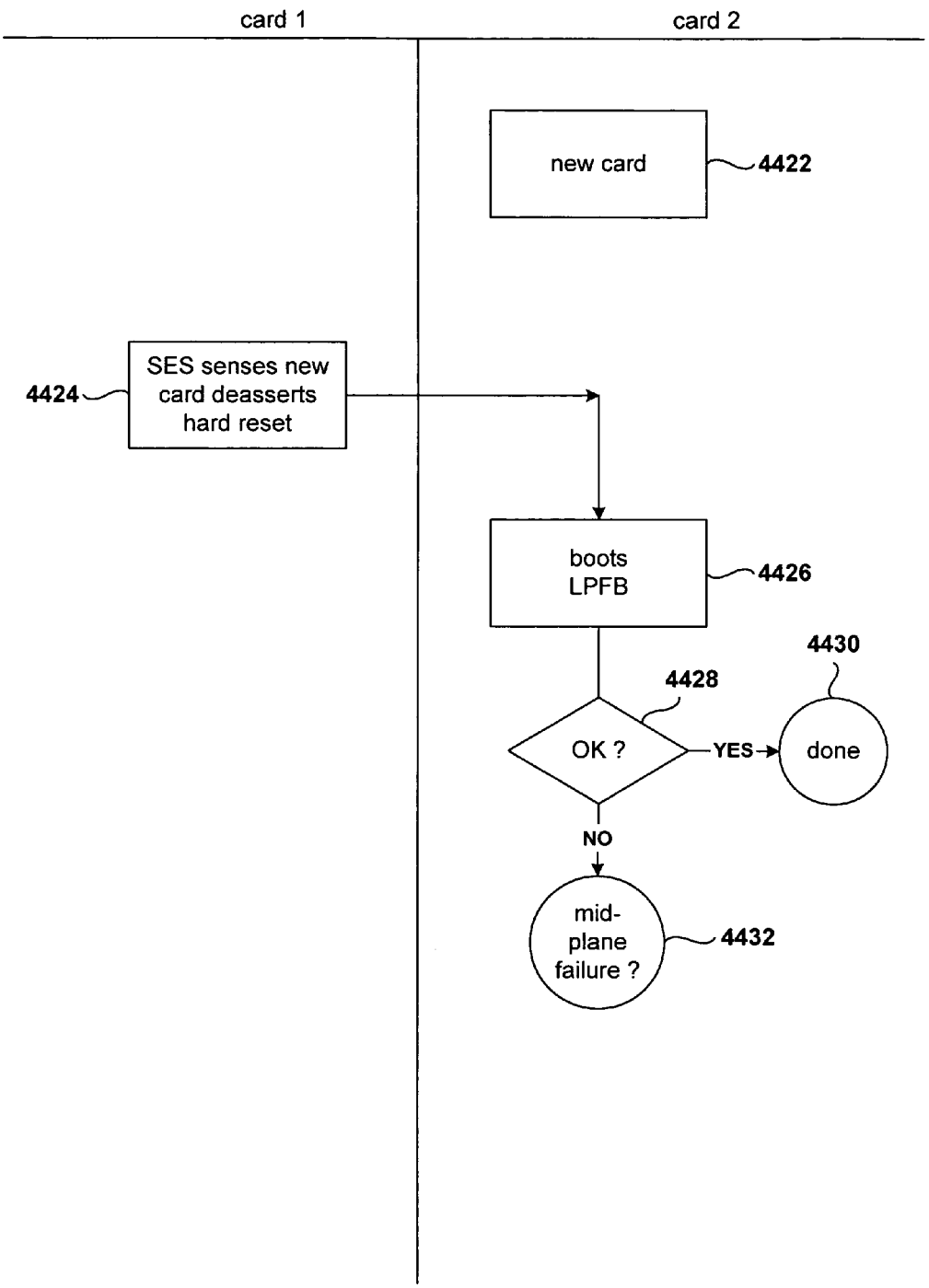

FIGS. 44A-B provide control-flow diagrams illustrating one router card replacement procedure. This procedure involves no down time and requires that two replacement cards are available with the same major version of firmware of, or a higher firmware revision than, the SR cards currently operating within the storage shelf. The router card replacement method begins, in FIG. 44A, with failure of a first SR card 4402. The second SR card detects this failure, carries out an LPFO, the first card generating a LIP and relinquishment of AL_PAs in step 4404, if the failure doesn't prevent the first card from doing so, and the SES processor detects the failure and asserts a hard reset on the failed card in step 4406. A new SR card is inserted to replace the failed SR card in step 4408. The SES processor of the second SR card detects insertion of the new SR card, in step 4410, and de-asserts the hard reset of the first SR card. This allows the newly inserted SR card to boot up, in step 4412. If the boot succeeds, as determined in step 4414, then the router card replacement is finished, in step 4416, and an LPBF occurs to rebalance the management tasks between SR cards. Otherwise, in step 4418, the newly inserted SR card carries out an LPFO, and the SES processor of the newly inserted SR card detects the LPFO and asserts a hard reset, in step 4420, to fail the second SR card. A new replacement card is inserted to replace the second SR card in step 4422. The SES processor of the first SR card senses the new card in step 4424, and de-asserts the hard reset. This allows the newly inserted SR card to boot up, in step 4426. If the boot succeeds, as determined in step 4428, then router card replacement has successfully completed, represented by state 4430. Otherwise, a new mid-plane failure is indicated, as represented by state 4432 in FIG. 44B.

Figure 45:
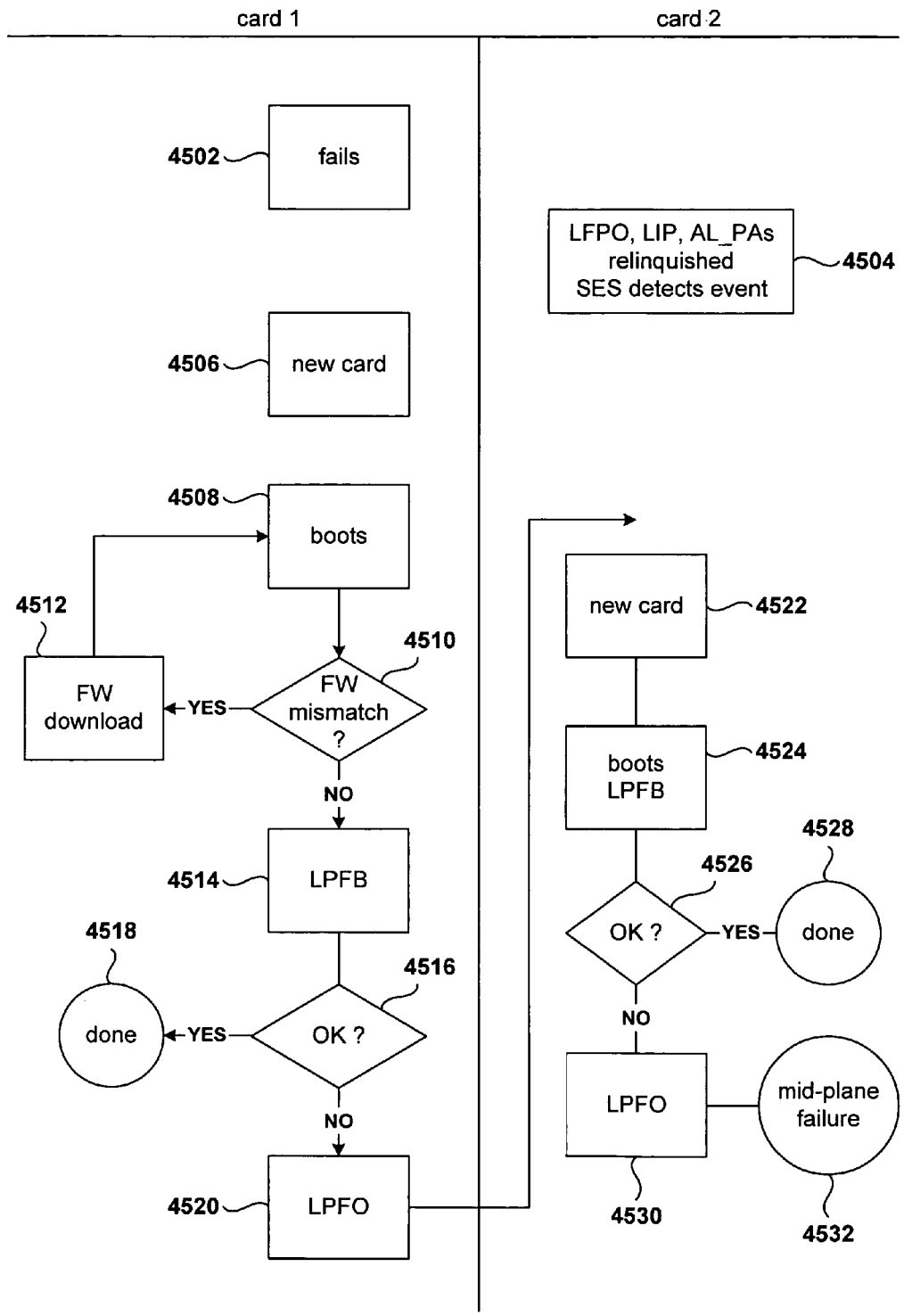
FIG. 45 provides a control-flow diagram illustrating a second router card replacement procedure.

FIG. 45 provides a control-flow diagram illustrating a second router card replacement procedure. This procedure requires no down time and requires one replacement SR card and an online download procedure for resolving firmware mismatches. The router card replacement method begins, in step 4502, with failure of a first SR card. The second SR card undertakes an LPFO, with the SES-processor detection of the event in step 4504. A new card is inserted to replace the failed card in step 4506. The new card boots up, in step 4508. If a major firmware mismatch is detected, in step 4510, then an online firmware download routine is invoked, in step 4512, and the boot undertaken again in step 4508. Otherwise, the newly inserted and newly booted card undertakes an LPFB, in step 4514. If the LPFB succeeds, as determined in step 4516, then the router card replacement is finished, as indicated by state 4518 in FIG. 45. Otherwise, the newly inserted card undertakes an LPFO, in step 4520. A new card is then inserted to replace the second SR card, in step 4522. The new card boots up, in step 4524, and undertakes an LPFB. If the LPFB succeeds, as determined in step 4526, then router card replacement succeeds, represented by state 4528 in FIG. 45. Otherwise, the newly inserted card undertakes an LPFO, in step 4530, and a mid-plane failure is indicated, represented by state 4532 in FIG. 45.

Although the present invention has been described in terms of a particular embodiment, it is not intended that the invention be limited to this embodiment. Modifications within the spirit of the invention will be apparent to those skilled in the art. For example, any number of different detection, diagnosis, and amelioration routines using different control flows, data structures, modular organizations, and other such variations may be employed to carry out the above-described methods. Many additional error conditions may be detected, diagnosed, and recovered by one or more SRs within the storage shelf. Error detection, diagnosis, and recovery may involve cooperation between SRs on a single SR card, and cooperation of SRs on different SR cards. The partitioning of diagnosis and recovery tasks between external processing entities, such as disk-array controllers, and the SRs within a storage shelf router may be partly or wholly configurable, and may depend on implementation details of disk-array controllers and other external processing entities. In certain cases, a single path fail-over may be undertaken, at the direction of an SR or at the direction of the disk-array controller, to correct certain disk-carrier failures and SATA link failures. In future implementations, additional redundant components may be included within storage shelves to allow for fully automated and complete error recovery in many different situations.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A method for handling errors and events arising in a storage shelf containing storage devices interconnected through path controller cards to storage-shelf routers contained on storage-shelf-router cards, the method comprising:
   detecting an error or event;
   diagnosing the error or event;

for an error or event remedied by automatically initiated replacement of a storage-shelf-router card, failing over path controller cards primarily managed by one or more storage-shelf routers on the storage-shelf-router card to be replaced by one or more different storage-shelf routers on surviving storage-shelf-router cards; and for an error or event within a mass-storage device or path-controller card, and for other errors and events that are configured for external management, reporting and logging the error or event for handling by an entity external to the storage shelf.

2. The method of claim 1 wherein the detected error is an external FC link failure ("EFCLF"), detected by events including link-down events and occurrence of cyclic-redundancy-check errors, diagnosed by loop-back tests following isolation of an internal FC mini-hub on a storage-router card, and remedied by automatic or directed fail over of a storage-router card.

3. The method of claim 1 wherein the detected error is an internal link failure ("ILF"), detected by events including link-down events and occurrence of cyclic-redundancy-check errors, diagnosed by loop-back tests following isolation of an internal FC mini-hub on a storage-router card, and remedied by automatic or directed fail over of a storage-router card.

4. The method of claim 1 wherein the detected error is an inter-card port failure ("ICPF"), detected by loss of heartbeat, diagnosed by an alternative path-controller-card-mailbox-based communication between storage-router cards and pad tests, and remedied by fail over of a storage-router card.

5. The method of claim 1 wherein the detected error is an inter-card link failure ("ICLF"), detected by loss of heartbeat, diagnosed by an alternative path-controller-card-mailbox-based communication between storage-router cards and pad tests, and remedied by fail over of a storage-router card.

6. The method of claim 1 wherein the detected error is an SATA port failure ("SPF"), detected by events including link-down events and occurrence of cyclic-redundancy-check errors, diagnosed by pad tests and loop back tests, and remedied by fail-over a storage-router card of event notification.

7. The method of claim 1 wherein the detected error is a management port failure ("MPF"), detected by periodic access of path-controller-microprocessor registers, diagnosed by internal storage router loopback, and remedied by reporting of the error to an external processing entity.

8. The method of claim 1 wherein the detected error is an uncontrolled critical failure, detected by loss of heartbeat, and remedied by fail-over of a storage-router card.

9. The method of claim 1 wherein the detected error is a controlled critical failure ("CCF"), detected by loss of heartbeat, and remedied by fail-over of a storage-router card.

10. The method of claim 1 wherein the detected error is a peer field replaceable unit removal ("PFR"), detected by de-assertion of a PEER_PRESENT signal, diagnosed by link testing, and remedied by fail-over of a storage-router card.

11. The method of claim 1 wherein the detected error is a field-replaceable-unit insertion fail back ("FBE"), detected by PEER-PRESENT signal assertion, diagnosed by a rendezvous protocol between storage-router cards, and remedied by a fail-back of path-controller cards to a newly inserted storage-router card.

12. The method of claim 1 wherein the detected error is a SATA management link failure ("MLF"), detected by periodic access of path-controller-microprocessor registers, diagnosed by internal storage router loopback, and remedied by reporting of the error to an external processing entity.

13. The method of claim 1 wherein the detected error is a SATA drive failure ("SDF"), detected by a failure of a command directed to a disk, and remedied by reporting of the SDF event to an external processing entity.

14. The method of claim 1 wherein the detected error is a drive-field-replaceable-unit removal ("FRE"), detected by de-assertion of a FRU_PRESENT signal and remedied by loop initialization and reporting of the FRE to an external processing entity.

15. The method of claim 1 wherein the detected error is a drive-field-replaceable-unit insertion ("FIE"), detected by, diagnosed by, and remedied assertion of a FRU_PRESENT signal and remedied by disk initialization and loop initialization and reporting of the FIE to an external processing entity.

16. The method of claim 1 further including, for an error or event remedied by failing over a single path-controller card, failing over the path-controller card from a first storage router on a first storage-router card to a second storage router on a second storage router card.

17. A method for replacing a storage-router card in a storage shelf, the method comprising:
    failure of a first storage-router card;
    detection of the failure of the first storage-router card by a second storage-router card;
    carrying out a local path failover by the second storage-router card;
    replacing the first storage-router card with a replacement first storage-router card;
    detection of the replacement first storage-router card by the second storage-router card;
    boot-up and initialization of the replacement first storage-router card;
    when the replacement first storage-router card properly initializes, carrying out a local path fail back to the replacement first storage-router card; and
    when the replacement first storage-router card does not properly boot, carrying out a local path fail over to the replacement first storage-router card and replacing the second storage-router card.

18. The method for replacing a storage-router card in a storage shelf of claim 17 further comprising:
    failure of a first storage-router card;
    detection of the failure of the first storage-router card by a second storage-router card;
    carrying out a local path failover by the second storage-router card;
    asserting a hard reset by the second storage-router card on the first storage-router card following carrying out a local path failover by the second storage-router card and preceding replacing the first storage-router card; and
    de-assertion of the hard reset by the second storage-router card following detection of the replacement of the first storage-router card by the second storage-router card and preceding boot-up and initialization of the replaced first storage-router card.

19. A storage shelf within a storage system comprising:

a storage shelf having at least two storage-routers included in at least two storage-router cards, a high-bandwidth interconnection between the two storage-router cards, a number of storage devices, each storage device interconnected to a path-controller card, the path controller card interconnected to two storage routers; and one or more failure domains, each failure domain comprising one of a storage-router card, a path-controller card and associated storage device, and components exterior to the storage-router-card failure domain, the path-controller-card-and-associated-storage-device failure domain, and interconnections between storage-router cards and storage-router-cards and path-controllers.

* * * * *